United States Patent
Saito

(10) Patent No.: US 8,305,608 B2
(45) Date of Patent: Nov. 6, 2012

(54) INFORMATION PROCESSING APPARATUS, INFORMATION PROCESSING METHOD, AND COMPUTER PROGRAM FOR INPUTTING INSERTION DATA TO A DATA AREA OF DOCUMENT DATA AND SENDING OUTPUT DATA PROCESSIBLE BY EACH OF PRINTING APPARATUSES

(75) Inventor: Masanori Saito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1072 days.

(21) Appl. No.: 12/044,921

(22) Filed: Mar. 7, 2008

(65) Prior Publication Data
US 2008/0225332 A1 Sep. 18, 2008

(30) Foreign Application Priority Data
Mar. 13, 2007 (JP) ................. 2007-064125

(51) Int. Cl.
- *G06K 15/00* (2006.01)
- *G06F 3/12* (2006.01)
- *B42D 15/00* (2006.01)
- *G09C 3/00* (2006.01)

(52) U.S. Cl. .............. 358/1.15; 358/1.14; 358/1.16; 283/67; 283/70; 283/74

(58) Field of Classification Search ............ 358/1.15, 358/1.6, 1.1, 1.8, 1.12, 1.14, 1.16; D18/36, D18/54; 283/67, 74, 81, 70; 709/208, 209
See application file for complete search history.

(56) References Cited

U.S. PATENT DOCUMENTS

| | | | |
|---|---|---|---|
| 5,978,557 | A | 11/1999 | Kato |
| 6,760,118 | B1 | 7/2004 | Kato |
| 6,760,120 | B2 | 7/2004 | Kato |
| 2004/0036917 | A1 | 2/2004 | Sano |
| 2005/0117176 | A1* | 6/2005 | Benz et al. ................. 358/1.15 |
| 2006/0041443 | A1* | 2/2006 | Horvath, Jr. .................... 705/1 |
| 2006/0055975 | A1* | 3/2006 | Toda .......................... 358/1.16 |
| 2007/0046995 | A1* | 3/2007 | Toda .......................... 358/1.16 |

FOREIGN PATENT DOCUMENTS

| | | |
|---|---|---|
| JP | 9-265362 | 10/1997 |
| JP | 10-283133 A | 10/1998 |
| JP | 11-53128 A | 2/1999 |
| JP | 2004-86281 A | 3/2004 |

* cited by examiner

Primary Examiner — Benny Q Tieu
Assistant Examiner — Ngon Nguyen
(74) Attorney, Agent, or Firm — Fitzpatrick, Cella, Harper & Scinto

(57) ABSTRACT

An information processing apparatus, capable of communicating with a plurality of printing apparatuses, for inputting insertion data to a data area of document data and sending output data processible by each printing apparatus, comprises: a classification unit adapted to classify a plurality of print data to be used for printing into a plurality of storage areas based on contents of insertion data to be inserted into document data; an output unit adapted to output output data based on the print data to an output destination associated with the storage area of the print data classified by the classification unit.

3 Claims, 23 Drawing Sheets

| NAME | ADDRESS |
|---|---|
| AKANUMA | KANAGAWA |
| INOUE | TOKYO |
| UENO | TOKYO |
| ENDO | KANAGAWA |
| OKAMOTO | TOKYO |
| KANEKO | KANAGAWA |

IF ADDRESS = KANAGAWA THEN TABLE A

IF ADDRESS = TOKYO THEN TABLE B

FIG. 8A

TABLE A 701

| 703 NAME | 704 ADDRESS | 705 PRINTING END FLAG | 706 PRINT JOB IDENTIFIER |
|---|---|---|---|
| AKANUMA | KANAGAWA | NO | |
| ENDO | KANAGAWA | NO | |
| KANEKO | KANAGAWA | NO | |

FIG. 8B

TABLE B 702

| NAME | ADDRESS | PRINTING END FLAG | PRINT JOB IDENTIFIER |
|---|---|---|---|
| INOUE | TOKYO | NO | |
| UENO | TOKYO | NO | |
| OKAMOTO | TOKYO | NO | |

FIG. 9

| CLASSIFIED INSERTION TABLE NAME | DISTRIBUTED PRINTING SYSTEM NAME |
|---|---|
| TABLE A | DISTRIBUTED PRINTING SYSTEM A |
| TABLE B | DISTRIBUTED PRINTING SYSTEM B |

1501 / 1502 / 901

INFORMATION PROCESSING APPARATUS, INFORMATION PROCESSING METHOD, AND COMPUTER PROGRAM FOR INPUTTING INSERTION DATA TO A DATA AREA OF DOCUMENT DATA AND SENDING OUTPUT DATA PROCESSIBLE BY EACH OF PRINTING APPARATUSES

BACKGROUND OF THE INVENTION

1. Field of the Invention

The present invention relates to an information processing apparatus, information processing method, and computer program and, in particular, to a suitable technique used to distribute and output a print job generated by inserting insertion data.

2. Description of the Related Art

Along with the recent increase in the speed and image quality of printing apparatuses using an electrophotographic method or ink-jet method, a print on demand market is emerging. The print on demand market will be expressed as a POD market hereinafter as needed. The POD market aims at handling a job of relatively small lot (e.g., a job of lot smaller than that handled by a printing apparatus) in a short delivery time without using a large-scale apparatus or system. Hence, the POD market implements digital printing using electronic data by making the most of a digital image forming apparatus such as a digital copy machine or digital multi-functional peripheral equipment in place of a printing method using a large-scale printing apparatus. In the POD market, business is conducted using printed products obtained by digital printing.

In this POD market, digitization has progressed, and management and control using computers have penetrated as compared to the conventional commercial printing industry. Utilization of computers is making the level of printed products in the recent POD market closer to that in the conventional commercial printing industry to some degree. Under these circumstances, PFP (Print For Pay), CRD (Centralized Reproduction Department), and the like exist in the POD market. The PFP has been implemented as a print service in copy print shops. The CRD has been implemented as a print service oriented to an intra-company (in-house) process.

One of the techniques used in the POD market is so-called VDP (Variable Data Print) that takes advantage of the characteristic features of a digital image forming apparatus. This technique prints contents which change in accordance with variable data (also referred to as insertion data) in, for example, a database. The VDP is usable for, for example, direct mail (DM) for providing information that changes for each customer in accordance with customer information or a billing statement that changes numerical values in accordance with the use state of, for example, heat and electricity. For this reason, the VDP has rapidly widespread in a market for creating, for example, direct mail (DM).

In the VDP, the amount of printing is enormous in many cases. To cope with this, the speed of image formation processing and that of print processing need to be higher. To increase the processing speed, a distributed printing system which prints using a plurality of printers simultaneously is used.

In the distributed printing system, created print jobs are distributed to a plurality of printers. For example, each print job is distributed such that the first print job is distributed to a printer A, and the second print job is distributed to a printer B. In this case, the VDP system can simultaneously operate the printers A and B by sending a print job to the printer B before the printer A finishes output. It is therefore possible to quickly finish print processing as compared to an arrangement using only one VDP system and one printer.

As described above, when the distributed printing system is used, the speed of print processing can be increased. To further speed up the print processing, it is necessary to increase the ratio of time in which all printers in the distributed printing system are executing print processing and make a print standby time without print processing of the printers as short as possible. That is, the VDP system must efficiently put print jobs in the printers.

To do this, conventionally, the VDP system monitors the status of each printer and preferentially sends a print job to a printer in a print standby status.

A host computer analyzes print data (document data) of each page and sends print data of a page determined to contain color data to a printing apparatus that supports color printing. On the other hand, the host computer sends print data of a page determined to be a monochrome page to a printing apparatus that supports monochrome printing. This technique is described in Japanese Patent Laid-Open No. 9-265362.

However, the technique described in Japanese Patent Laid-Open No. 9-265362 may be unable to efficiently execute print processing if, for example, document data of 100 pages includes color data in pages 1 to 50 and monochrome data in pages 51 to 100. That is, since the technique described in Japanese Patent Laid-Open No. 9-265362 executes print processing in the order of pages, the monochrome printer starts print processing after generation of the print data of page 51.

Hence, the technique described in Japanese Patent Laid-Open No. 9-265362 may be unable to implement parallel processing using a plurality of printers.

SUMMARY OF THE INVENTION

The present invention has been made in consideration of the above-described problem, and has as its object to increase the efficiency of print processing by efficiently operating a plurality of printers.

According to one aspect of the present invention, an information processing apparatus, capable of communicating with a plurality of printing apparatuses, for inputting insertion data to a data area of document data and sending output data processible by each printing apparatus, comprises:

a classification unit adapted to classify a plurality of print data to be used for printing into a plurality of storage areas based on contents of insertion data to be inserted into document data; and an output unit adapted to output output data based on the print data to an output destination associated with the storage area of the print data classified by the classification unit.

According to another aspect of the present invention, an information processing method in an information processing apparatus, capable of communicating with a plurality of printing apparatuses, for inputting insertion data to a data area of document data and sending output data processible by each printing apparatus, the method comprises:

a classification step of classifying a plurality of print data to be used for printing into a plurality of storage areas based on contents of insertion data to be inserted into document data; and an output step of outputting output data based on the print data to an output destination associated with the storage area of the print data classified in the classification step.

According to still another aspect of the present invention, a computer program stored in a computer-readable medium to be executed by an information processing apparatus, capable of communicating with a plurality of printing apparatuses, for inputting insertion data to a data area of document data and sending output data processible by each printing apparatus, the computer program causes a computer to execute:

a classification step of classifying a plurality of print data to be used for printing into a plurality of storage areas based on contents of insertion data to be inserted into document data; and an output step of outputting output data based on the print data to an output destination associated with the storage area of the print data classified in the classification step.

Further features of the present invention will become apparent from the following description of exemplary embodiments (with reference to the attached drawings).

BRIEF DESCRIPTION OF THE DRAWINGS

FIG. 7 is a view showing an example of classification information held by a workflow manager according to the first embodiment of the present invention;

FIGS. 8A and 8B are tables showing examples of a classified insertion table group created by a queue manager using the insertion table shown in FIG. 6 and the classification information shown in FIG. 7 according to the first embodiment of the present invention;

FIG. 9 is a table showing an example of a correspondence table between classified insertion table names and distributed printing system names according to the first embodiment of the present invention;

DESCRIPTION OF THE EMBODIMENTS

Figure 1:
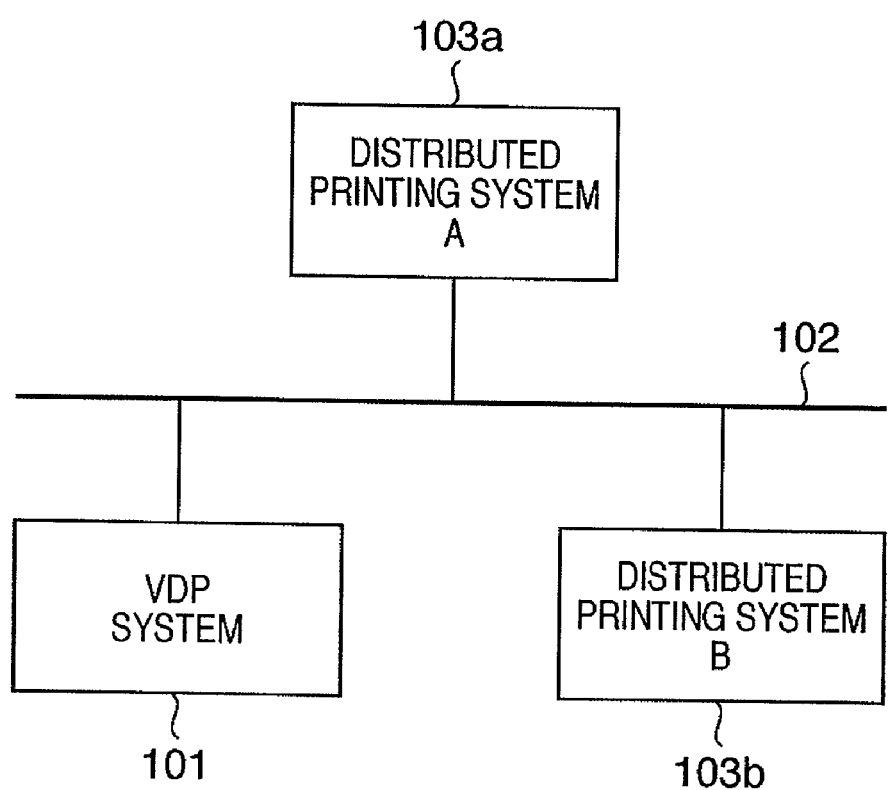
FIG. 1 is a block diagram showing the schematic arrangement of a printing system according to the first embodiment of the present invention.

An embodiment of the present invention will now be described with reference to the accompanying drawings. FIG. 1 is a block diagram showing the schematic arrangement of a printing system according to an embodiment of the present invention.

Referring to FIG. 1, the printing system includes a VDP system 101, data transfer interface 102, and two distributed printing systems (distributed printing systems A and B) 103a and 103b. The two distributed printing systems (distributed printing systems A and B) 103a and 103b are connected to the VDP system 101 via the data transfer interface 102 that is a network such as the Internet or a LAN. That is, the printing system shown in FIG. 1 includes the plurality of distributed printing systems 103a and 103b. FIG. 1 exemplifies a printing system including one VDP system 101 and two distributed printing systems 103. However, the printing system may include two or more VDP systems 101 and three or more distributed printing systems 103.

Figure 2:
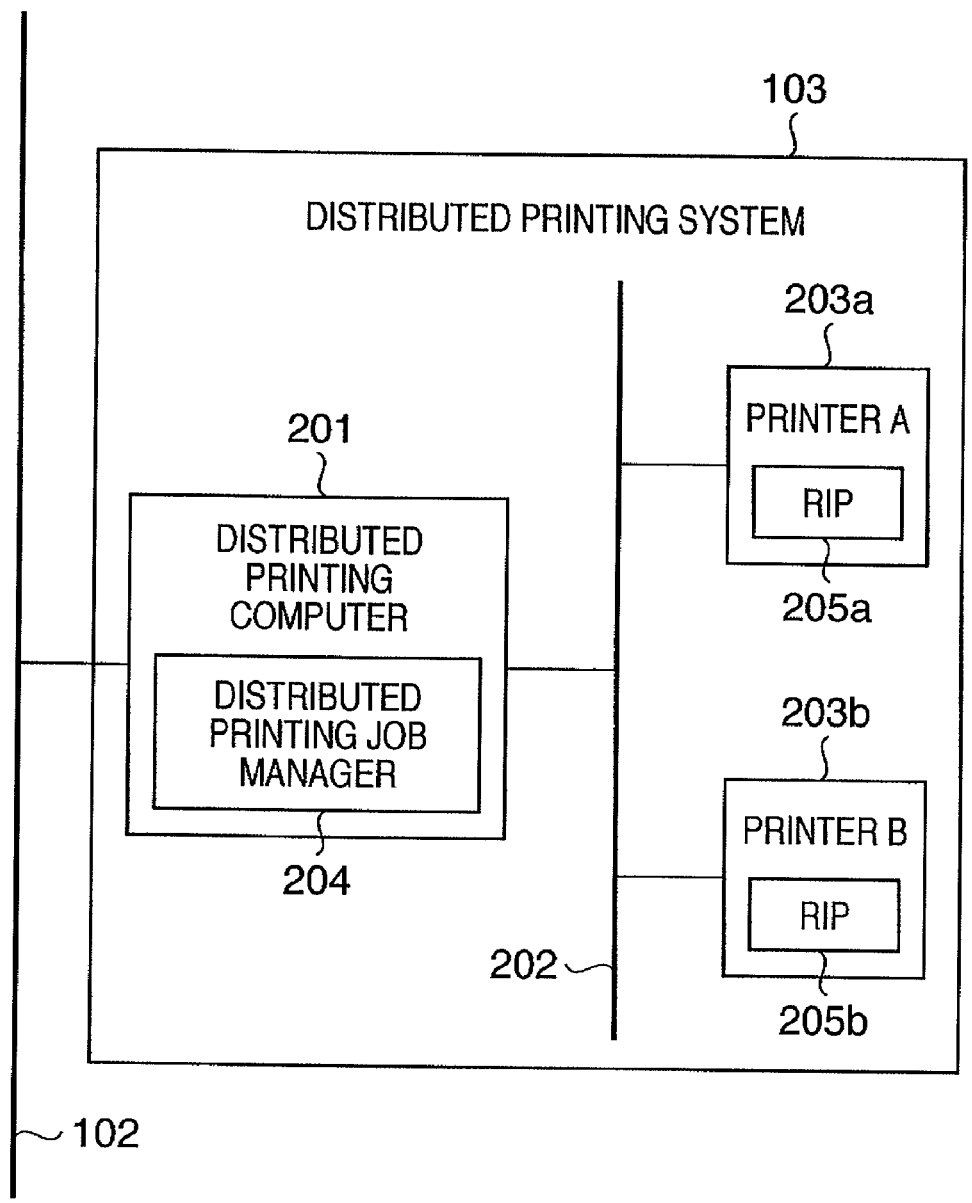
FIG. 2 is a block diagram showing an example of the module configuration of a distributed printing system according to the first embodiment of the present invention.

FIG. 2 is a block diagram showing an example of the module configuration of each distributed printing system 103.

Referring to FIG. 2, the distributed printing system 103 includes a distributed printing computer 201 as an example of a data processing apparatus (information processing apparatus), a data transfer interface 202, and two printers (printers A and B) 203a and 203b as examples of a printing apparatus. The two printers (printers A and B) 203a and 203b are connected to the distributed printing computer 201 via the data transfer interface 202 that is a network such as the Internet or a LAN. That is, each of the distributed printing systems 103 includes one or more printers 203. The information processing apparatus of the present invention can communicate with a plurality of printing apparatuses. The information processing apparatus inputs insertion data to the data area of document data and sends the output data processible by each printing apparatus.

The distributed printing computer 201 executes distributed printing. The distributed printing computer 201 is, for example, a personal computer including a CPU, ROM, RAM, hard disk, and various kinds of interfaces, as will be described later. The distributed printing computer 201 receives a print job from the VDP system 101 via the data transfer interface 102. The distributed printing computer 201 sends the print job to the printers 203a and 203b via the data transfer interface 202, as needed.

A distributed printing job manager 204 is implemented using a computer program stored in, for example, a hard disk. The distributed printing job manager 204 executes, on the distributed printing computer 201, processing of distributing and sending print jobs received by the distributed printing computer 201 to printers 203 in the distributed printing system 103 to which the distributed printing job manager 204 belongs. Additionally, for all printers 203 in the distributed printing system 103 to which the distributed printing job manager 204 belongs, the distributed printing job manager 204 can also acquire, from each printer 203, information representing that the printer 203 is in a printing status or in a print standby status. The distributed printing job manager 204 can also acquire, from the printer 203, information representing an end of printing based on a received print job, and notify the user of it. Each of RIPs (Raster Image Processors) 205a and 205b executes, on the corresponding printer 203, processing of rasterizing a print job received from the distributed printing computer 201 into raster data.

In the example shown in FIG. 2, the distributed printing job manager 204 operates on the distributed printing computer 201, and each RIP 205 operates on the corresponding printer 203. However, the distributed printing job manager 204 may operates on a printer 203, and the RIP 205 may operate on the distributed printing computer 201. Two or more distributed printing computers 201 may be used. The data transfer interfaces 102 and 202 may share one interface.

Figure 3:
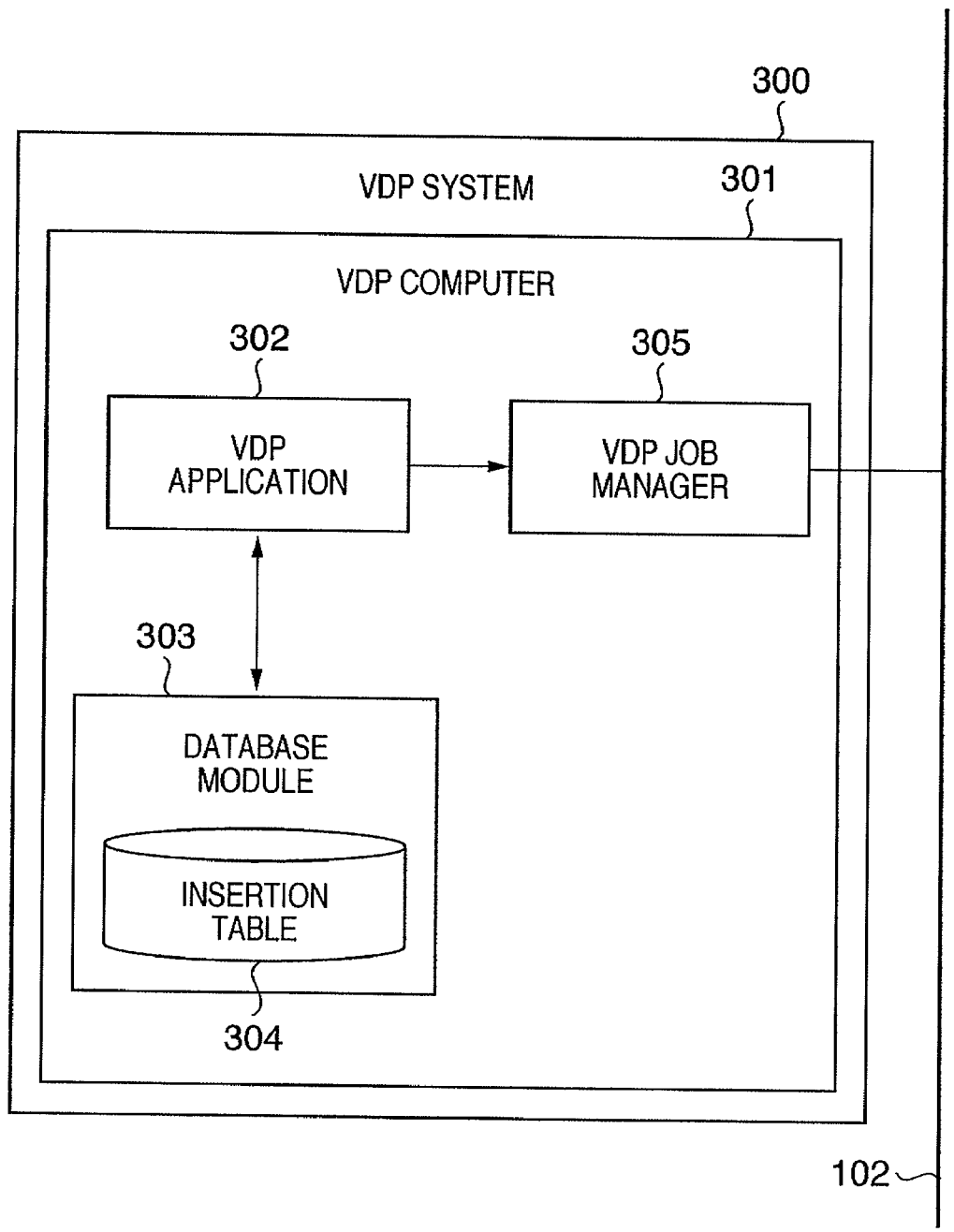
FIG. 3 is a block diagram showing an example of the basic module configuration of a VDP system according to the first embodiment of the present invention.

FIG. 3 is a block diagram showing an example of the basic module configuration of the VDP system.

A VDP system 300 shown in FIG. 3 includes a VDP computer 301. The VDP computer 301 is, for example, a personal computer including a CPU, ROM, RAM, hard disk, and various kinds of interfaces, as will be described later.

Referring to FIG. 3, a VDP application 302 receives insertion data from a database module 303, creates a print job using the received insertion data, and transfers the print job to a VDP job manager 305. The VDP application 302 is implemented using a computer program for creating a print job. The database module 303 manages (operates) an insertion table 304, acquires insertion data from the insertion table 304 in response to a request from the VDP application 302, and transfers the insertion data to the VDP application 302. The database module 303 is implemented using a computer program stored in, for example, a hard disk.

The insertion table 304 holds insertion data to be used by the VDP application 302 and is stored in, for example, a hard disk. The VDP job manager 305 sends a print job created by the VDP application 302 to the distributed printing system 103 via the data transfer interface 102. The VDP job manager 305 is implemented using a computer program stored in, for example, a hard disk.

In the VDP system 300 shown in FIG. 3, the VDP application 302 creates and edits a VDP document based on a user operation. The VDP document includes an insertion area and an insertion data type. The VDP application 302 acquires insertion data designated by the insertion data type from the insertion table 304 in the database module 303. That is, the VDP document is a template having an area to which insertion data is inserted.

The VDP application 302 creates print jobs using the acquired insertion data and sends the created print jobs to the VDP job manager 305. The VDP job manager 305 distributes and sends the received print jobs to the plurality of distributed printing systems 103a and 103b. Upon receiving the print jobs sent from the VDP system 300, the distributed printing job manager 204 in the distributed printing system 103 distributes and sends the received print jobs to the plurality of printers as needed. Upon receiving the print jobs, the printers 203a and 203b cause the RIPs 205a and 205b to execute RIP processing for the print jobs and output the results of RIP processing as printed products.

Figure 4:
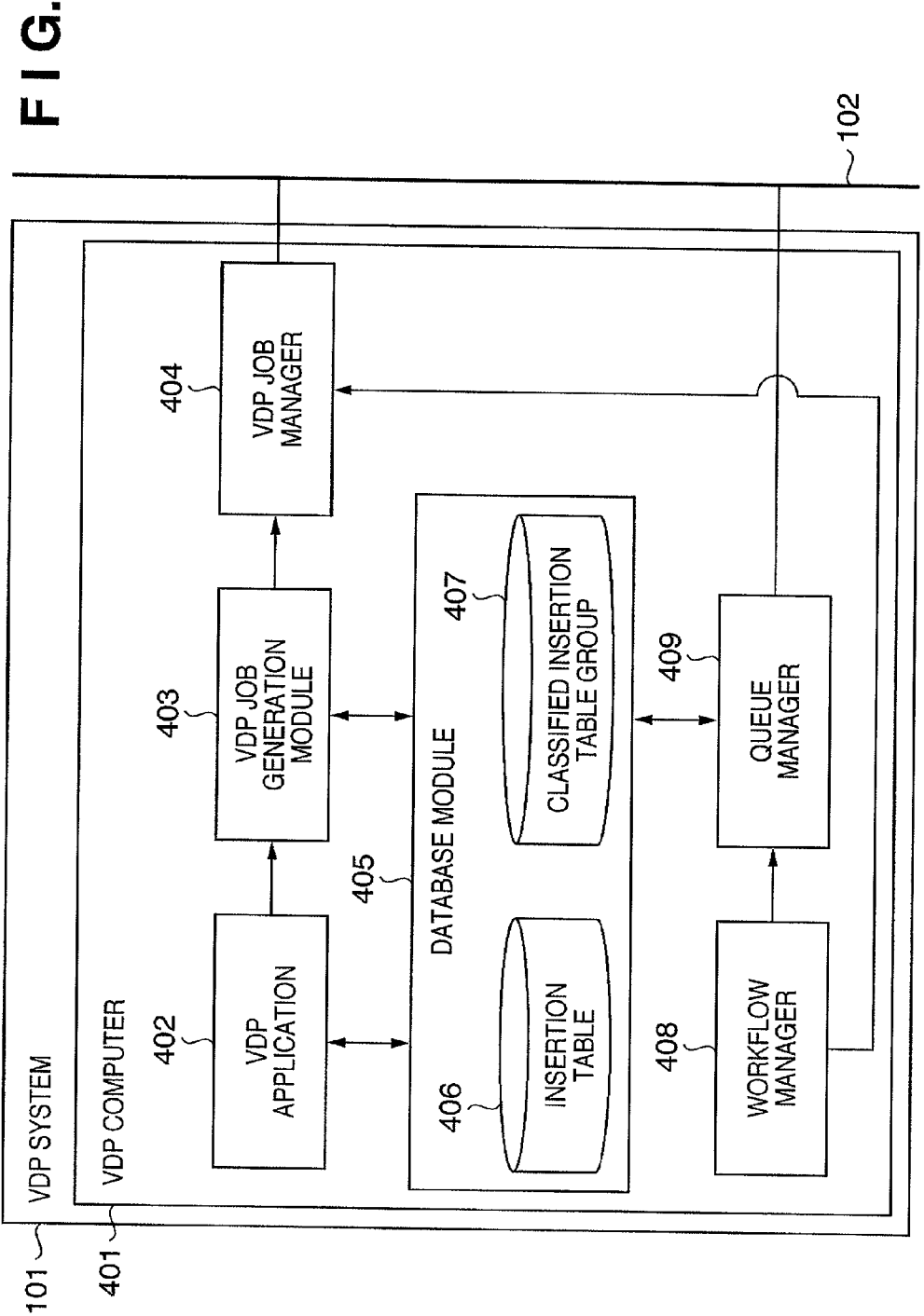
FIG. 4 is a block diagram showing an example of the module configuration of the VDP system according to the first embodiment of the present invention.

FIG. 4 is a block diagram showing an example of the module configuration of the VDP system 101 according to this embodiment.

The VDP system 101 shown in FIG. 4 includes a VDP computer 401. The VDP computer 401 is, for example, a personal computer including a CPU, ROM, RAM, hard disk, and various kinds of interfaces, as will be described later. The following processing is implemented by transmitting/receiving (exchanging) signals (data) between the blocks shown in FIG. 4.

In FIG. 4, a VDP application 402 is implemented using a computer program for creating a VDP document. The VDP application 402 receives insertion data from a database module 405 and creates a VDP document including an area to lay out the insertion data. A VDP job generation module 403 receives the VDP document from the VDP application 402 and also receives classified insertion data from the database module 405. The VDP job generation module 403 creates a print job using the VDP document and the classified insertion data and transfers the print job to a VDP job manager 404. The VDP job generation module 403 is implemented using a computer program stored in, for example, a hard disk. The VDP application 402 can also display the preview of a VDP document including areas with insertion data.

The VDP job manager 404 sends print jobs created by the VDP job generation module 403 to the distributed printing systems 103 via the data transfer interface 102. The VDP job manager 404 is implemented using a computer program stored in, for example, a hard disk.

The database module 405 manages (operates) an insertion table 406, acquires insertion data from the insertion table 406 in response to a request from the VDP application 402, and transfers the insertion data to the VDP application 402. The database module 405 also manages (operates) a classified insertion table group 407 and registers classified insertion table groups and classified insertion data. The database module 405 acquires a classified insertion table and classified insertion data from the classified insertion table group 407 in response to a request from the VDP job generation module 403 and transfers the classified insertion table and classified insertion data to the VDP job generation module 403. The database module 405 is implemented using a computer program stored in, for example, a hard disk. A classified insertion table is a storage area to store, for example, classified insertion data.

The insertion table 406 holds insertion data to be used by the VDP application 402 and is stored in, for example, a hard disk. The classified insertion table group 407 includes a plurality of classified insertion tables each of which holds classified insertion data created by a queue manager 409. The classified insertion table group 407 is stored in, for example, a hard disk.

The queue manager 409 receives insertion data from the database module 405 and processes the insertion data in accordance with classification information received from a workflow manager 408. The queue manager 409 causes the classified insertion table group 407 to hold the processed insertion data as classified insertion data via the database module 405. The queue manager 409 is implemented using a computer program stored in, for example, a hard disk.

The workflow manager 408 sends classification information to the queue manager 409. The workflow manager 408 holds classification information and also holds the correspondence table between classified insertion table names and distributed printing system names. The workflow manager 408 is implemented using, for example, a storage medium such as a hard disk and a computer program stored in the hard disk. In this embodiment, the classification information and correspondence table held by the workflow manager 408 are prepared in advance by, for example, an input operation of the system administrator (user).

The blocks (modules) 402 to 409 shown in FIG. 4 may operate on a plurality of computers or on the distributed printing computer 201.

Figure 5:
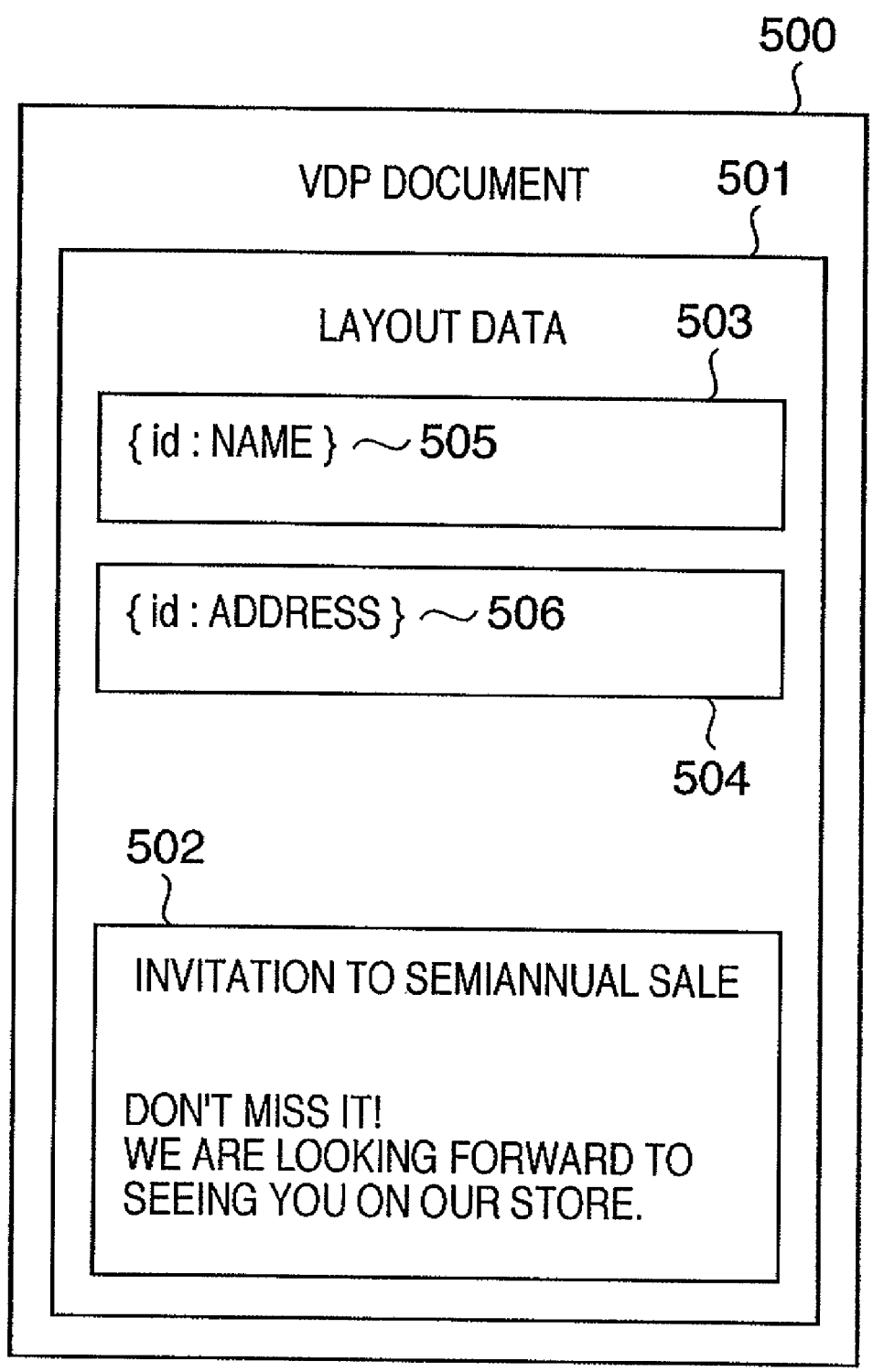
FIG. 5 is a conceptual view showing an example of the structure of a VDP document generated by a VDP application according to the first embodiment of the present invention.

FIG. 5 is a conceptual view showing an example of the structure of a VDP document generated by the VDP application 402.

Referring to FIG. 5, a VDP document 500 includes layout data 501. A rendering object 502 except insertion data is directly described in the layout data 501. The layout data 501 also has insertion areas (also referred to as data areas) 503 and 504 to insert insertion data, and insertion data types 505 and 506.

Figure 6:
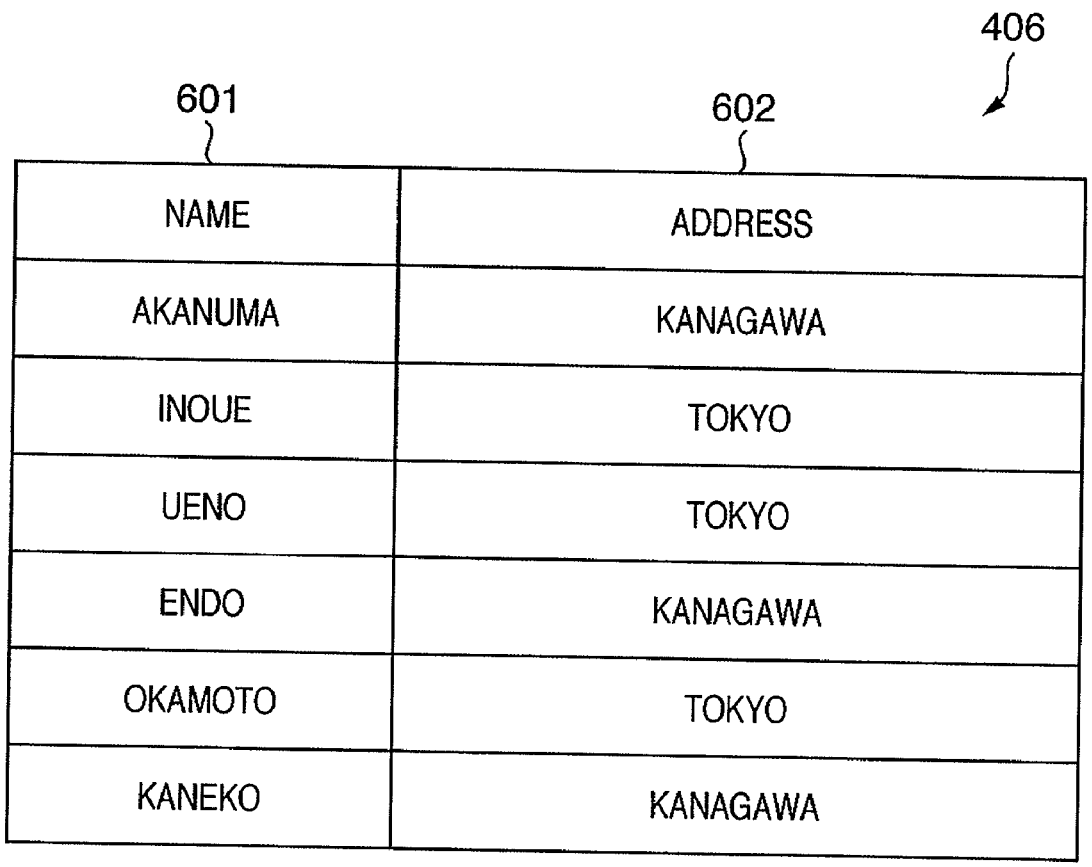
FIG. 6 is a table showing an example of an insertion table according to the first embodiment of the present invention.

FIG. 6 is a table showing an example of the insertion table 406.

In the insertion table 406 shown in FIG. 6, the field of insertion data types 601 and 602 have insertion data corresponding to them. In FIG. 6, record data (insertion data group) is formed by combining the insertion data of a name "Akanuma" and the insertion data of an address "Kanagawa".

FIG. 7 is a view showing an example of classification information held by the workflow manager 408.

Classification information 1400 shown in FIG. 7 describes that an insertion data group whose insertion data type "address" is "Kanagawa" is classified into a table A of the classified insertion table group 407. Additionally, the classification information 1400 shown in FIG. 7 describes that an insertion data group whose insertion data type "address" is "Tokyo" is classified into a table B of the classified insertion table group. That is, the classification information 1400 in FIG. 7 shows an example in which "address" is selected as a predetermined data item in insertion data that is variable data, and "Kanagawa" and "Tokyo" are selected as predetermined values to be classified. As described above, in this embodiment, the system administrator operates a user interface provided by the workflow manager 408, thereby setting the classification information 1400 shown in FIG. 7.

FIGS. 8A and 8B are tables showing examples of the classified insertion table group 407 created by the queue manager 409 using the insertion table 406 shown in FIG. 6 and the classification information 1400 shown in FIG. 7. In these examples, the classified insertion table group 407 is formed from two classified insertion tables (tables A and B) 701 and 702.

Each of the classified insertion tables 701 and 702 stores insertion data types 703 and 704, insertion data corresponding to them, a printing end flag 705, and a print job identifier 706 in correspondence with each other. The insertion data types 703 and 704 correspond to the insertion data types 601 and 602 stored in the insertion table 406.

FIG. 9 is a table showing an example of a correspondence table between classified insertion table names and distributed printing system names. As described above, the workflow manager 408 holds a correspondence table 901. In the example shown in FIG. 9, names 1501 of classified insertion tables included in the classification information 1400 shown in FIG. 7 and names 1502 of distributed printing systems on the system are stored in correspondence with each other.

In the correspondence table 901, not only the classified insertion table names and distributed printing system names but also the printers 203 in the distributed printing systems 103 indicated by the distributed printing system names 1502 can be associated. When the classified insertion table names and printers are associated with each other, not only the distributed printing system 103 but also a printer to be used for printing can be designated.

As described above, in this embodiment, the system administrator operates a user interface provided by the workflow manager 408, thereby setting the correspondence table 901 shown in FIG. 9.

As described above, the classified insertion table stores classified insertion data. The correspondence table 901 associates the names 1501 of classified insertion tables and the names 1502 of the distributed printing systems 103 with each other. When classified insertion data is registered in the classified insertion table, the correspondence table 901 associates the insertion data (classified insertion data) with the distributed printing system 103 (or printer 203) of the insertion data sending destination. For example, according to this embodiments the data "Akanuma-Kanagawa" in FIG. 6 is registered in the table A and therefore output to the distributed printing system A.

Figure 10:
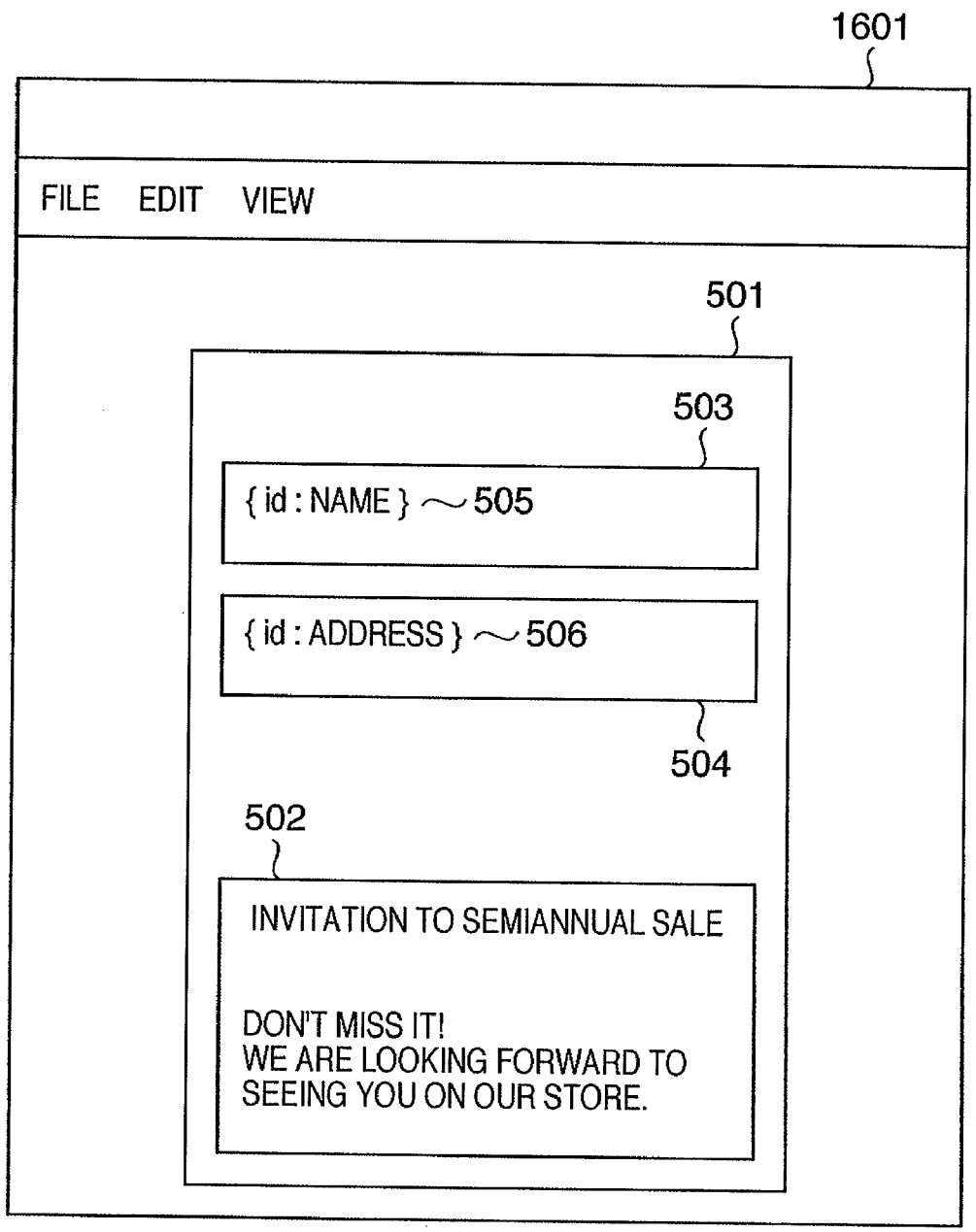
FIG. 10 is a view showing an example of a screen to create a VDP document on a VDP application according to the first embodiment of the present invention.

FIG. 10 is a view showing an example of a screen to create the VDP document 500 on the VDP application 402. Referring to FIG. 10, the layout data 501 representing the layout of the VDP document 500 is displayed on an area 1601 editable by the system administrator.

The system administrator instructs to create the VDP document 500 by laying out, on the layout data 501, the rendering object 502 except insertion data, and the insertion areas 503 and 504 to insert insertion data. The insertion areas 503 and 504 are areas where insertion data are laid out. For this reason, the contents to be actually printed are not displayed on the VDP application 402, and the system administrator can grasp only the printing position of insertion data. The system administrator associates the insertion data types 505 and 506 with the insertion areas 503 and 504. The system administrator selects the insertion data types 505 and 506 from those acquired from the insertion table 406 by the VDP application 402 via the database module 405.

Figure 11:
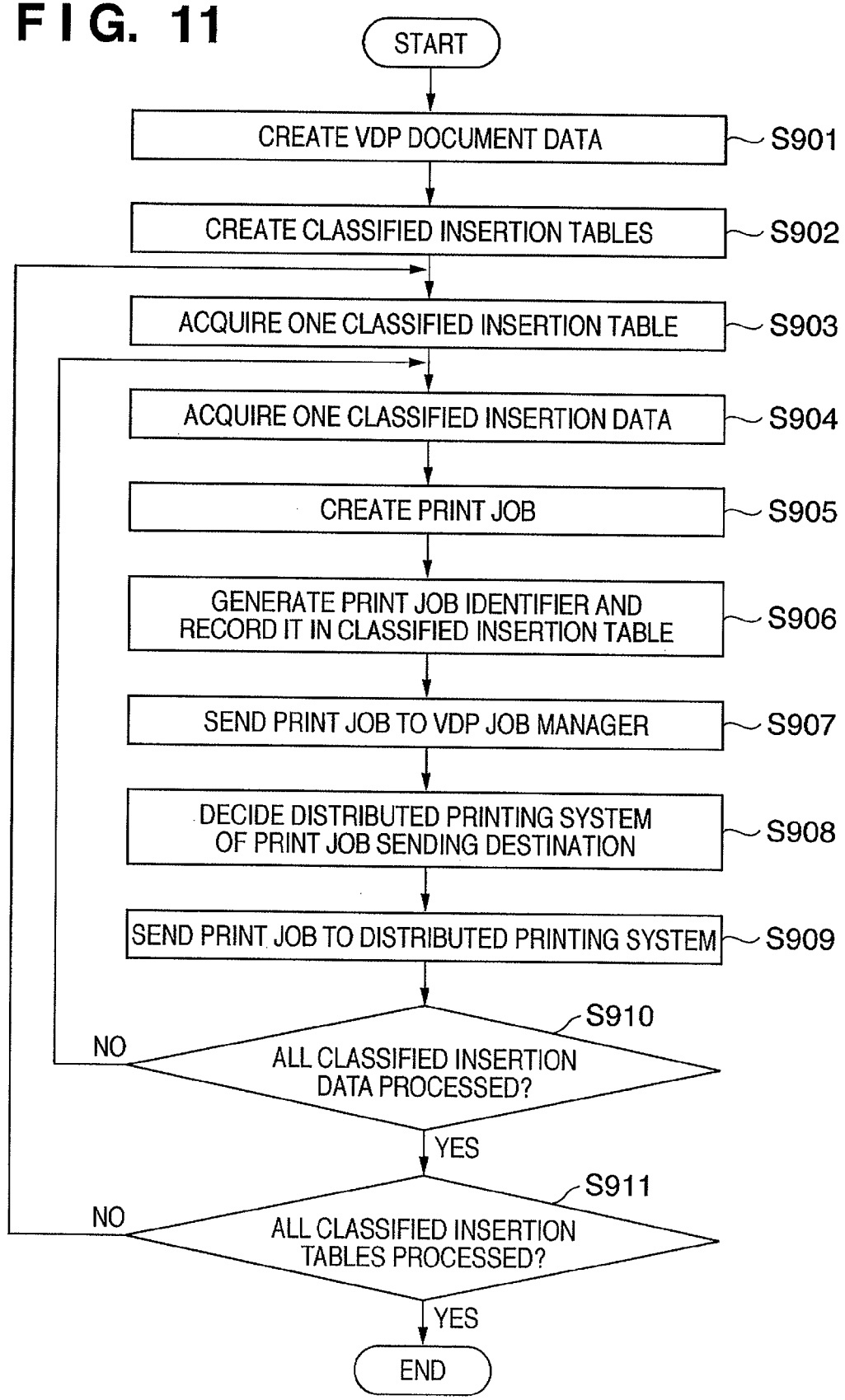
FIG. 11 is a flowchart for explaining an example of print processing of the VDP system according to the first embodiment of the present invention.

An example of print processing of the VDP system 101 will be described with reference to the flowchart in FIG. 11. The CPU executes the steps of the flowchart in FIG. 11.

In step S901, the VDP application 402 displays, on the display, a screen to create the VDP document 500 (see FIG. 10). The VDP application 402 creates the VDP document 500 based on the operation on the screen by the system administrator (user).

In step S902, the queue manager 409 creates the classified insertion table group 407 using the insertion table 406 and the classification information 1400 (see FIGS. 6 to 8A and 8B). The processing in step S902 will be described later in detail.

In step S903, the VDP job generation module 403 acquires one classified insertion table from the classified insertion table group 407 via the database module 405. This processing corresponds to processing of acquiring, for example, one of the classified insertion tables 701 and 702 in FIGS. 8A and 8B. In step S904, the VDP job generation module 403 acquires one classified insertion data group from the classified insertion table group 407 acquired via the database module 405. This processing corresponds to processing of acquiring, for example, a classified insertion data group "Akanuma-Kanagawa" from the classified insertion table 701 in FIG. 8A.

In step S905, the VDP job generation module 403 creates a print job using the classified insertion data acquired in step S904 and the VDP document 500 created in step S901.

Figure 12:
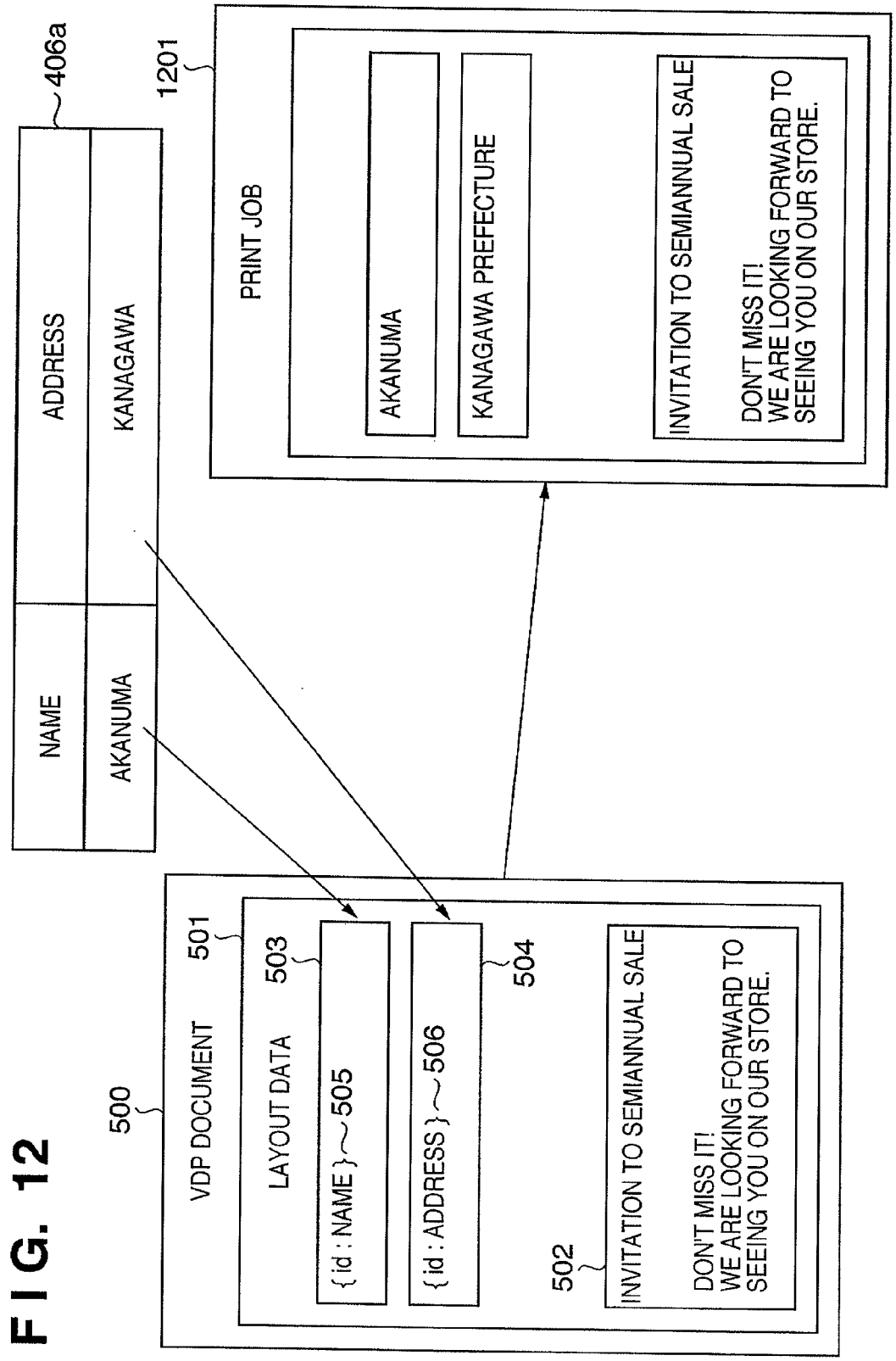
FIG. 12 is a conceptual view showing an example of the relationship between a VDP document and a print job according to the first embodiment of the present invention.

FIG. 12 is a conceptual view showing an example of the relationship between a VDP document and a print job. The VDP job generation module 403 pastes, in the insertion areas 503 and 504, insertion data 406*a* corresponding to the insertion data types 505 and 506 associated with the insertion areas 503 and 504 of the VDP document 500 as rendering objects. A print job 1201 is thus generated.

As described above, in this embodiment, a generation unit is implemented by, for example, executing the processing in step S905.

In step S906, the VDP job generation module 403 generates a print job identifier to uniquely identify the print job 1201 and embeds the generated print job identifier in the print job 1201. The VDP job generation module 403 records the print job identifier embedded in the print job in the classified insertion table as the print job identifier of the classified insertion data via the database module 405.

In step S907, the VDP job generation module 403 sends, to the VDP job manager 404, the print job 1201 and the classified insertion table names (e.g., the tables A and B shown in FIGS. 8A and 8B) used to create the print job 1201.

In step S908, the VDP job manager 404 acquires the correspondence table 901 between the classified insertion table names and the distributed printing system names from the workflow manager 408 (see FIG. 9). The VDP job manager 404 decides the distributed printing system 103 from the distributed printing system names included in the correspondence table 901 acquired from the workflow manager 408. That is, the VDP job manager 404 outputs output data to be used for printing to the output destination associated with the classified insertion table.

In this embodiment, if the number of printed classified insertion data changes between the plurality of classified insertion tables, the classification destinations of classified insertion data may be changed (steps S1205 and S1206 in FIG. 14), as will be described later. If the classification destinations of classified insertion data are changed, the VDP job manager 404 determines the distributed printing system 103 from the (latest) distributed printing system names associated with the classified insertion tables 701 and 702 as the changed classification destinations.

If the correspondence table 901 also stores the printers 203 in the distributed printing systems 103 indicated by the distributed printing system names 1502, the VDP job manager 404 determines, from the stored printers 203, the printer 203 that should actually execute printing.

In step S909, the VDP job manager 404 sends the print job 1201 from the VDP job generation module 403 to the distributed printing system 103 determined in step S908. As described above, in this embodiment, an output unit is implemented by, for example, executing the processing in steps S908 and S909.

In step S910, the VDP job generation module 403 determines whether all classified insertion data groups are acquired from the classified insertion tables 701 and 702 acquired in step S903. If it is determined that not all classified insertion data groups are acquired, the processing from step S904 is executed for classified insertion data that are not yet acquired.

If all classified insertion data groups are acquired, the process advances to step S911. In step S911, the VDP job generation module 403 determines whether all classified insertion tables 701 and 702 are acquired from the classified insertion table group 407. If it is determined that not all classified insertion tables 701 and 702 are acquired, the processing from step S903 is executed for the classified insertion tables 701 and 702 that are not yet acquired. If all classified insertion tables 701 and 702 are acquired, the print processing by the VDP system 101 is ended.

Preferably, one thread corresponding to one of the classified insertion tables 701 and 702 is created by using a multithread function prepared by the OS (Operating System), and the processing in steps S904 to S910 is performed on the thread.

Figure 13:
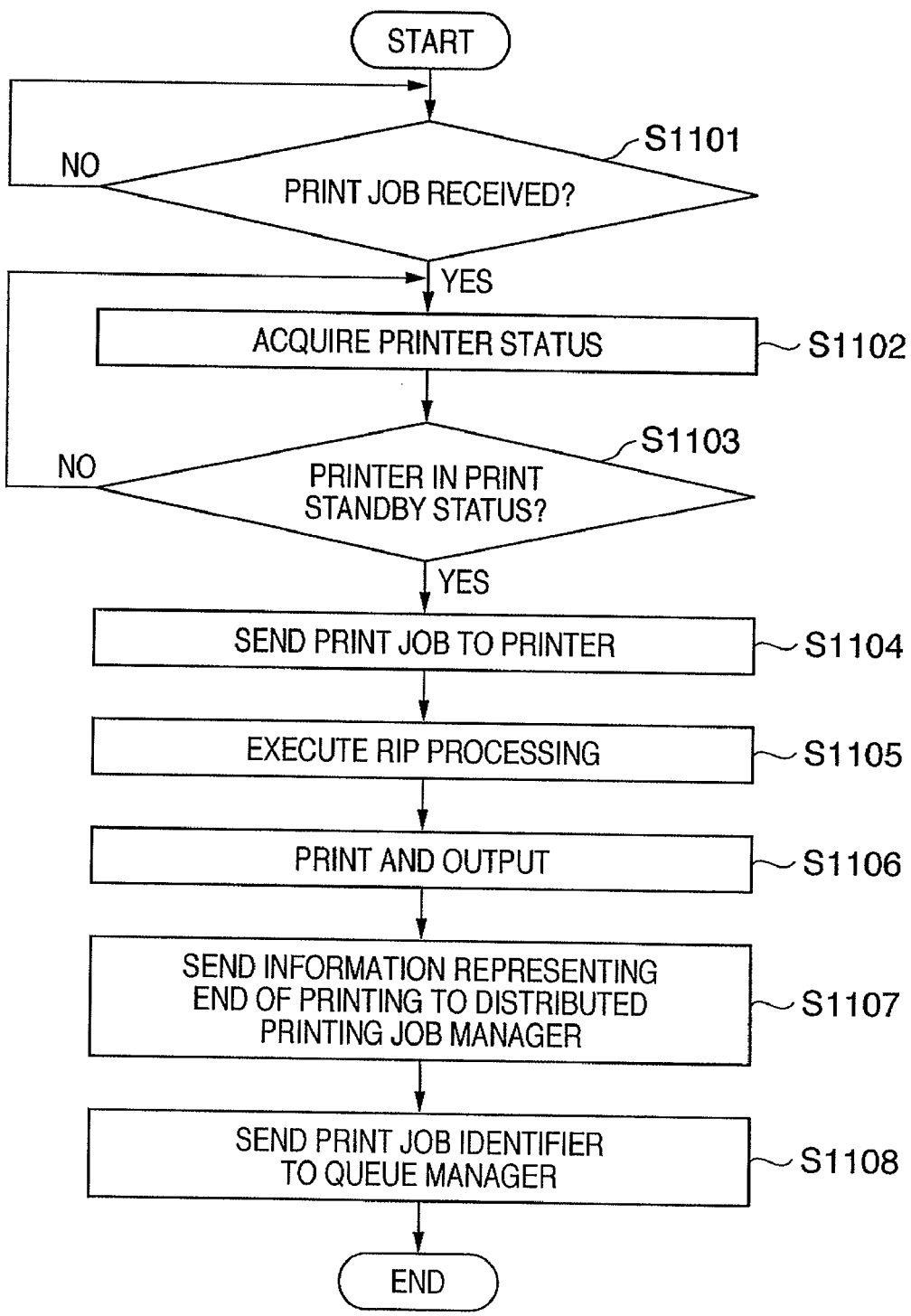
FIG. 13 is a flowchart for explaining an example of print processing of the distributed printing system according to the first embodiment of the present invention.

An example of print processing of the distributed printing system 103 will be described next with reference to the flowchart in FIG. 13.

In step S1101, the distributed printing job manager 204 waits for reception of the print job 1201 sent from the VDP system 101. When the print job 1201 is received, the process advances to step S1102.

In step S1102, the distributed printing job manager 204 acquires, from all printers 203*a* and 203*b* in the distributed printing system 103 to which the distributed printing job manager 204 belongs, information representing that the printers 203*a* and 203*b* are in a printing status or in a print standby status.

In step S1103, the distributed printing job manager 204 determines based on the information acquired in step S1102 whether a printer in the print standby status exists. If it is determined that no printers 203 are in the print standby status, the processing from step S1102 is executed again. If a printer 203 in the print standby status exists, the process advances to step S1104. In step S1104, the distributed printing job manager 204 sends the print job 1201 determined in step S1101 to be received to the printer 203 determined in step S1103 to be in the print standby status.

If the received print job 1201 designates not only the distributed printing system 103 but also a printer to be used for printing, the distributed printing job manager 204 determines in step S1103 whether the designated printer is in the print standby status.

In step S1105, upon receiving the print job 1201, the printer 203 causes the RIP 205 to execute RIP processing of the received print job 1201 and convert it into raster data.

In step S1106, the printer 203 outputs and prints the raster data generated in step S1105.

In step S1107, the printer 203 sends information representing the end of print output to the distributed printing job manager 204.

In step S1108, the distributed printing job manager 204 sends, to the queue manager 409 of the VDP system 101, the print job identifier of the print job 1201 which is output and printed by the printer 203. Then, the print processing of the distributed printing system 103 is ended.

Figure 14:
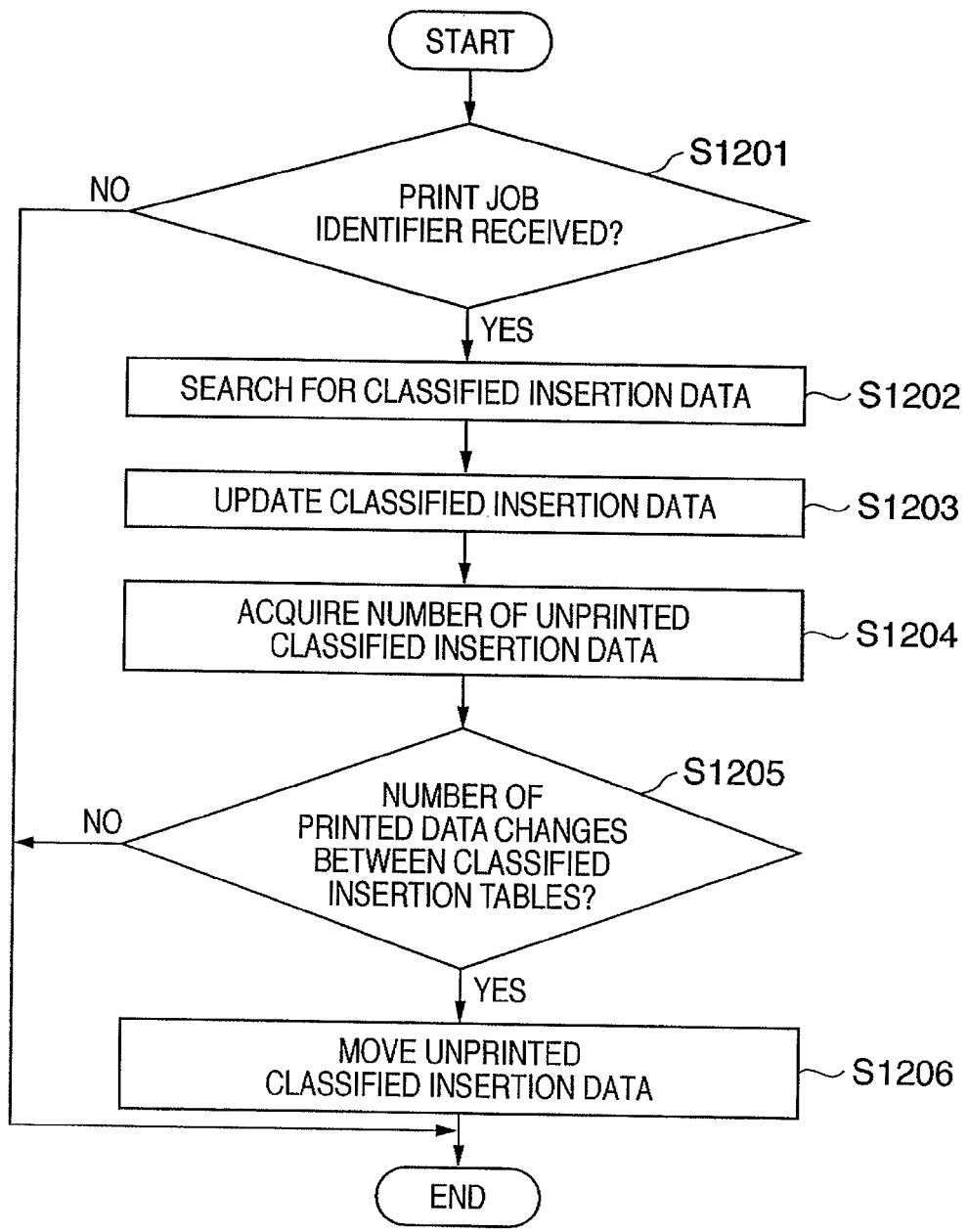
FIG. 14 is a flowchart for explaining an example of processing of updating classified insertion data during print processing according to the first embodiment of the present invention.

An example of processing of causing the VDP computer 301 in the VDP system 101 to update classified insertion data during print processing will be described with reference to the flowchart in FIG. 14.

In step S1201, the queue manager 409 determines whether the print job identifier of the printed print job 1201 is received from the distributed printing job manager 204 in the distributed printing system 103. If it is determined that the print job identifier of the printed print job 1201 is not received, the processing of updating the classified insertion data during print processing is ended.

As described above, in this embodiment, an acquisition unit is implemented by, for example, acquiring the print job identifier of the printed print job 1201 as a print job execution status in the processing in step S1201.

If the print job identifier of the printed print job 1201 is received, the process advances to step S1202. In step S1202, the queue manager 409 searches, via the database module 405, the classified insertion table group 407 for classified insertion data that matches the print job identifier received in step S1201.

In step S1203, the queue manager 409 turns on the printing end flag of the classified insertion data found via the database module 405 (see FIGS. 8A and 8B).

In step S1204, the queue manager 409 acquires, from the classified insertion table group 407, the number of classified insertion data with the printing end flag in the OFF state in correspondence with each of the classified insertion tables 701 and 702.

In step S1205, the queue manager 409 determines whether the number of classified insertion data with the printing end flag in the OFF state is different between the classified insertion tables 701 and 702 by a predetermined number or more. If it is determined that the number of classified insertion data with the printing end flag in the OFF state does not change by a predetermined number or more, the processing of updating the classified insertion data during print processing is ended.

If the number of classified insertion data with the printing end flag in the OFF state is different by a predetermined number or more, the process advances to step S1206. In step S1206, the queue manager 409 acquires, via the database module 405, all classified insertion tables 701 and 702 having a difference of a predetermined number or more. The queue manager 409 moves the classified insertion data with the printing end flag in the OFF state from a classified insertion table including classified insertion data with the printing end flag in the OFF state in a relatively large number to a classified insertion table including classified insertion data with the printing end flag in the OFF state in a relatively small number. Then, the processing of updating the classified insertion data during print processing is ended.

As described above, in this embodiment, a first change unit which changes the storage area of classified print data to another storage area based on an acquired print job execution status is implemented by, for example, the processing in steps S1205 and S1206. In this case, the VDP job manager 305 outputs output data to a printing apparatus associated with the other changed classified insertion table.

An example of processing of creating the classified insertion table group 407 will be described with reference to the flowchart in FIG. 15.

In step S1301, the queue manager 409 acquires the classification information 1400 from the workflow manager 408 (see FIG. 7).

In step S1302, the queue manager 409 acquires one insertion data from the insertion table 406 via the database module 405 (see FIG. 6).

In step S1303, the queue manager 409 determines, in accordance with the classification information 1400 acquired in step S1301, a classified insertion table to which the insertion data acquired in step S1302 should be copied. For example, the queue manager 409 decides to copy the insertion data "Akanuma-Kanagawa" of the first record in FIG. 6 to the table A based on the classification information 1400 in FIG. 7.

That is, the queue manager 409 classifies a plurality of insertion data to be used for printing to a plurality of classified insertion tables based on the contents of insertion data to be inserted into document data.

In step S1304, the queue manager 409 determines, via the database module 405, whether the classified insertion table group 407 already includes the classified insertion table to which the insertion data should be copied. If it is determined that the classified insertion table group 407 does not include the classified insertion table to which the insertion data should be copied, the process advances to step S1305. In step S130S, the queue manager 409 newly creates the classified insertion table determined in step S1303 in the classified insertion table group 407 via the database module 405. The process advances to step S1306.

If the classified insertion table group 407 already includes the classified insertion table to which the insertion data should be copied, the process skips step S1305 and advances to step S1306.

In step S1306, the queue manager 409 adds the insertion data acquired in step S1302 to the classified insertion table determined in step S1303.

In step S1307, the queue manager 409 turns off the printing end flag of the insertion data added in step S1306 via the database module 405 and also sets a print job identifier in a blank field (see FIGS. 8A and 8B).

Figure 15:
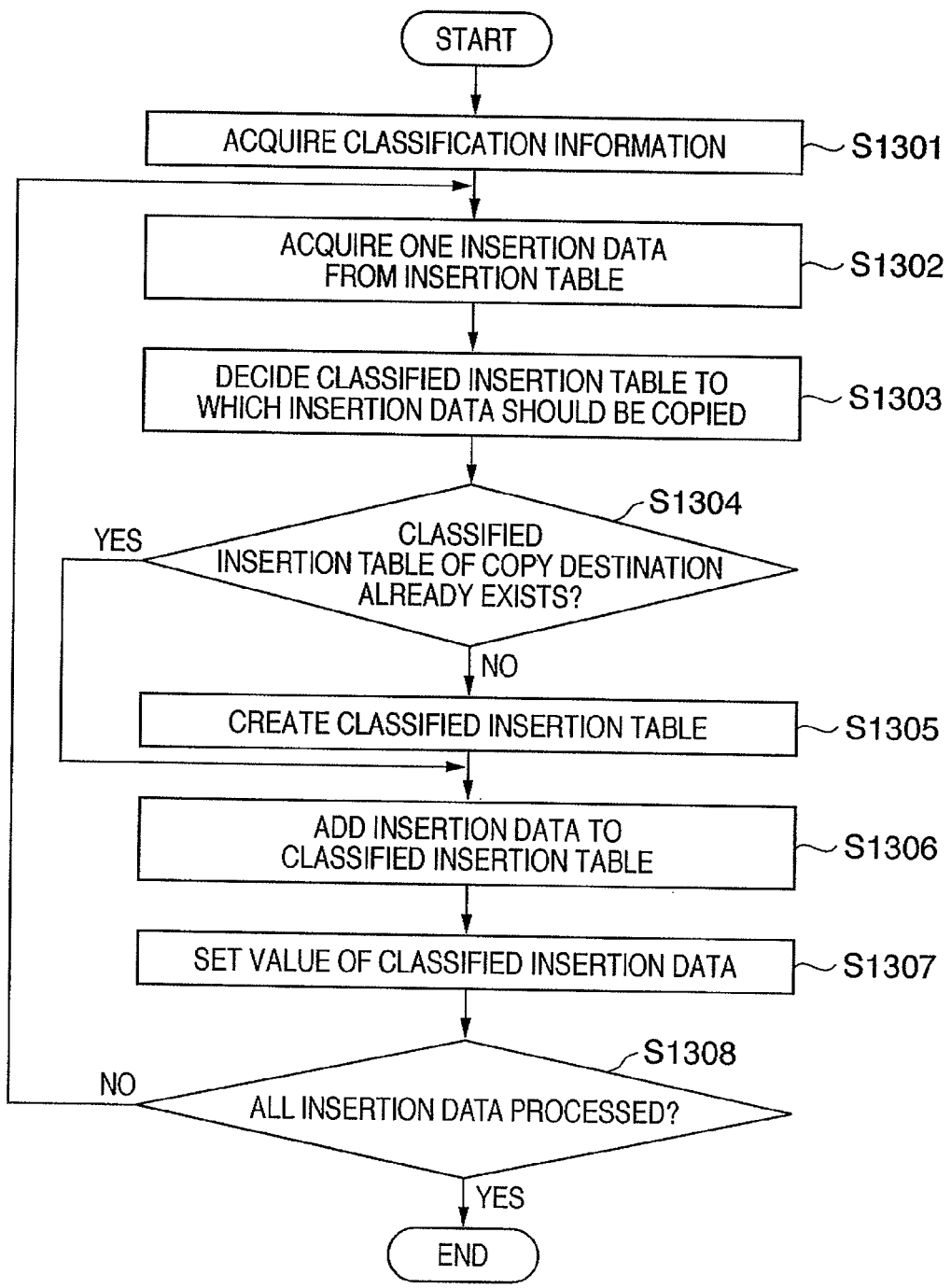
FIG. 15 is a flowchart for explaining an example of classified insertion table group creation processing according to the first embodiment of the present invention.

As described above, in this embodiment, a classification unit is implemented by, for example, executing the processing in FIG. 15. In this embodiment, the classification unit classifies a plurality of insertion data to a plurality of classified insertion tables. However, the classification target is not limited to insertion data and may be a print job. Hence, the classification target need only be print data to be used for printing.

As described above, when classified insertion data is registered in a classified insertion table, the correspondence table 901 associates the classified insertion data with the distributed printing system 103 (or printer 203) of the sending destination of the classified insertion data.

In step S1308, the queue manager 409 determines whether all insertion data are acquired from the insertion table 406. If it is determined that not all insertion data are acquired, the processing from step S1302 is executed for insertion data that are not yet acquired. If all insertion data are acquired, the classified insertion table group creation processing is ended.

Figure 16:
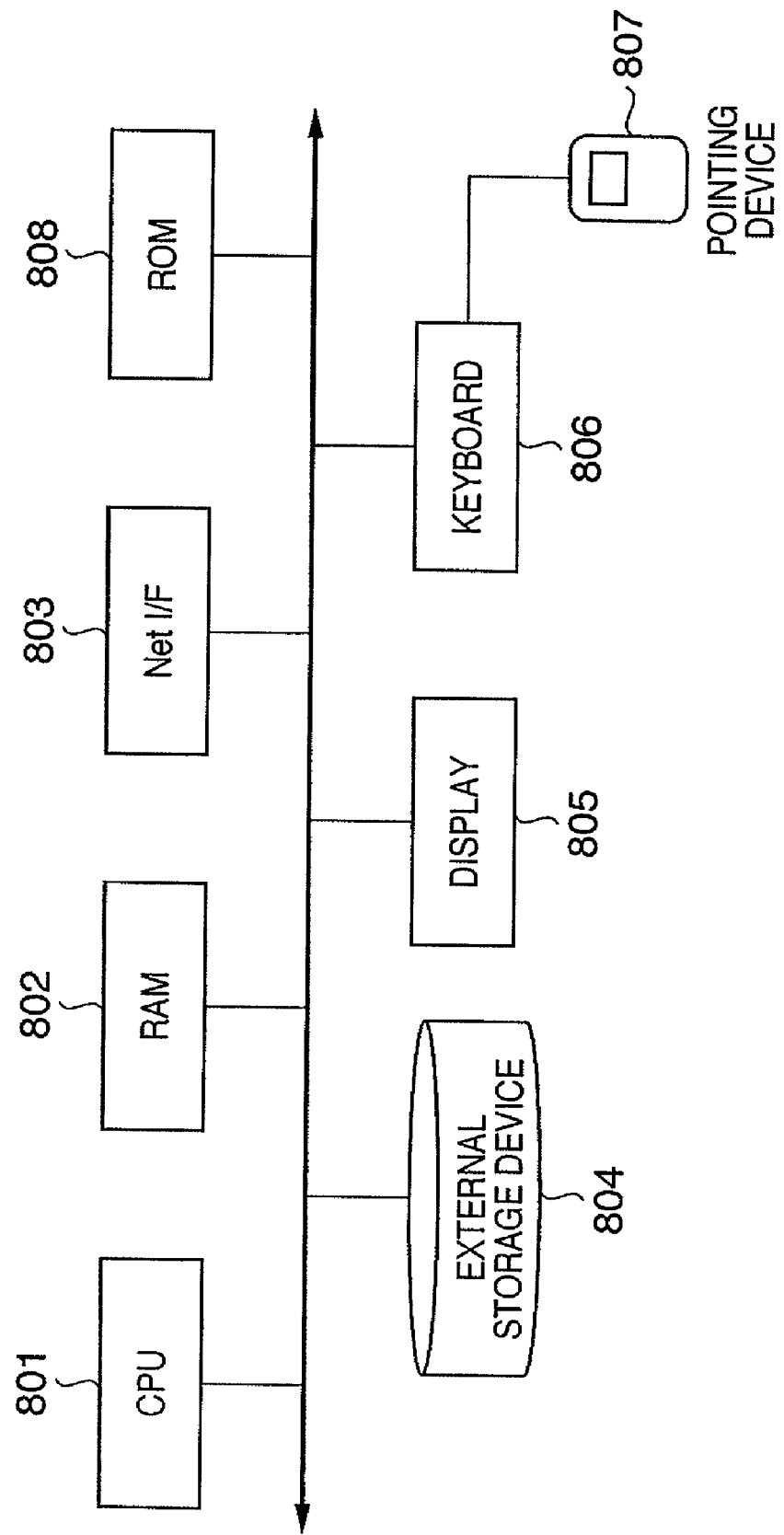
FIG. 16 is a block diagram showing an example of the hardware configuration of a computer used in the printing system according to the first embodiment of the present invention.

FIG. 16 is a block diagram showing an example of the hardware configuration of a computer used in the printing system of this embodiment having the above-described functions.

A CPU 801 expands, on a RAM 802, a control program stored in an external storage device (e.g., hard disk) 804 and controls the entire apparatus. The RAM 802 is an internal storage unit which temporarily stores the control program of the apparatus to be executed by the CPU 801, and document and image data. A network interface (Net I/F) 803 is connected to the data transfer interface 102 or 202 such as the Internet to transmit/receive data under the control of the CPU 801. A ROM 808 is an internal storage unit which stores various kinds of data. The ROM 808 may store the control program.

The external storage device 804 is a storage unit such as a hard disk (magnetic disk) which saves data and computer programs. A display 805 is a computer display such as an LCD (Liquid Crystal Display). A keyboard 806 and a pointing device 807 such as a mouse are user interfaces.

The control program saved in the external storage device (hard disk) 804 executes, for example, the following processing using the functions of the operating system stored in the external storage device (hard disk) 804. The control program reads or writes data contents temporarily stored in the RAM 802, reads or writes data on the external storage device 804, or transmits or receives data via the network interface 803. The control program also receives an input from the keyboard 806 or pointing device 807, or displays an image on the display 805. These processes implement at least some of the processes shown in FIGS. 11 and 13 to 15.

As described above, in this embodiment, the workflow manager 408 stores in advance the classification information 1400 and the correspondence table 901 between the classified insertion table names and the distributed printing system names. The queue manager 409 classifies insertion data stored in the insertion table 406 in accordance with the classification information 1400 and stores them in the classified insertion tables 701 and 702. The VDP job generation module 403 creates the print job 1201 using the classified insertion data stored in the classified insertion tables 701 and 702 and the VDP document 500. The VDP job manager 404 decides the distributed printing system 103 of the sending destination of the print job 1201 based on the correspondence table 901 between the classified insertion table names and the distributed printing system names, and sends the print job 1201 to the distributed printing system 103.

In the above-described way, the insertion data to change the print contents are classified and stored in the classified insertion tables 701 and 702, thereby forming the classified insertion tables 701 and 702 as the databases for the distributed printing systems 103. Based on the correspondence table 901 between the classified insertion table names and the distributed printing system names, the sending destination of each classified insertion data stored in the classified insertion tables 701 and 702 is decided, and the classified insertion data is sent.

The insertion data to change the print contents are classified, and the distributed printing system 103 of the sending destination of the print job 1201 is determined in accordance with the classification destination in this way. It is therefore possible to efficiently distribute a print job to the distributed printing system 103 desired by the user. For example, in the example shown in FIGS. 8A, 8B, and 9, the print job 1201 based on the classified insertion data in the classified insertion table (table A) 701 can be output to the distributed printing system (distributed printing system A) 103 of Kanagawa Prefecture. On the other hand, the print job 1201 based on the classified insertion data in the classified insertion table (table B) 702 can be output to the distributed printing system (distributed printing system B) 103 of Tokyo Metropolis.

Instead of determining the distributed printing system 103 (printer 203) of the sending destination of the print job 1201 after generation of the print job 1201, the distributed printing system 103 (printer 203) of the sending destination is determined in advance based on the correspondence table 901. It is therefore possible to efficiently decide a printer to be used even when the distributed printing system 103 includes the printers 203 of different properties.

The print status of the print job 1201 in each printer 203 is monitored, and the databases (classified insertion tables 701 and 702) formed for the distributed printing system 103 are changed (updated) during print processing. It is therefore possible to more efficiently determine the distributed printing system 103 (printer 203) to be used, and also speed up print processing.

If the number of printed classified insertion data is different between the plurality of databases (classified insertion tables 701 and 702) formed for the distributed printing system 103, the process load on the specific distributed printing system 103 (printer 203) increases. In this case, unprinted classified insertion data are moved from a classified insertion table including printed classified insertion data in a large number to a classified insertion table including printed classified insertion data in a small number. The processing can more efficiently be executed by changing the processing order in the classified insertion tables 701 and 702 in this way.

Second Embodiment

The second embodiment of the present invention will be described next. The above-described first embodiment and the second embodiment are different in part of print processing shown in FIG. 11 and processing of creating a classified insertion table group 407 shown in FIG. 15. In the second embodiment, a queue manager 409 and a VDP job generation module 403 communicate with each other. That is, the second embodiment and the above-described first embodiment are mainly different in print processing and classified insertion table group creation processing. Hence, the same reference numerals as in FIGS. 1 to 16 of the above-described first embodiment denote the same parts in the second embodiment, and a detailed description thereof will not be repeated.

An example of processing (print processing and classified insertion table group creation processing) executed by a VDP application 402 and the queue manager 409 will be described with reference to the flowchart in FIG. 17. In this embodiment, the flowchart shown in FIG. 17 and that shown in FIG. 18 (to be described later) are executed in place of the flowcharts shown in FIGS. 11 and 15 of the above-described first embodiment.

In step S1701, the VDP application 402 displays, on the display, a screen to create a VDP document 500 (see FIG. 10). The VDP application 402 creates the VDP document 500 based on the operation on the screen by the system administrator (user).

In step S1702, the queue manager 409 acquires classification information 1400 from a workflow manager 408 (see FIG. 7).

In step S1703, the queue manager 409 acquires one insertion data from an insertion table 406 via a database module 405.

In step S1704, the queue manager 409 decides, in accordance with the classification information 1400 acquired in step S1702, a classified insertion table to which the insertion data acquired in step S1703 should be copied.

In step S1705, the queue manager 409 determines, via the database module 405, whether a classified insertion table group 407 already includes the classified insertion table to which the insertion data should be copied. If it is determined that the classified insertion table group 407 does not include the classified insertion table to which the insertion data should be copied, the process advances to step S1706. In step S1706, the queue manager 409 newly creates the classified insertion table determined in step S1704 in the classified insertion table group 407 via the database module 405. The process advances to step S1707.

If the classified insertion table group 407 already includes the classified insertion table to which the insertion data should be copied, the process skips step S1706 and advances to step S1707.

In step S1707, the queue manager 409 adds the insertion data acquired in step S1703 to the classified insertion table determined in step S1704.

In step S1708, the queue manager 409 turns off the printing end flag of the insertion data added in step S1707 via the database module 405 and also sets a print job identifier in a blank field (see FIGS. 8A and 8B).

In step S1709, the queue manager 409 acquires, via the database module 405, the number of classified insertion data added to the classified insertion table decided in step S1704.

In step S1710, the queue manager 409 determines whether the number of added classified insertion data is a predetermined number or more. At this time, in this embodiment, the queue manager 409 determines whether the number of classified insertion data added to a single classified insertion table is a predetermined number or more (i.e., determines for each classified insertion table whether the number of classified insertion data is a predetermined number or more). As described above, in this embodiment, a first determination unit is implemented by, for example, executing the processing in step S1710.

If it is determined that the number of added classified insertion data is a predetermined number or more, the process advances to step S1711.

In step S1711, the queue manager 409 creates one thread using a multi-thread function prepared by the OS (Operating System) and operates the VDP job generation module 403. The queue manager 409 notifies the VDP job generation module 403 of the classified insertion table determined in step S1704. The process advances to step S1712. From then on, the VDP job generation module 403 and the queue manager 409 operate asynchronously. Processing of the VDP job generation module 403 will be described later.

If the number of added classified insertion data is not a predetermined number or more, the process skips step S1711 and advances to step S1712.

In step S1712, the queue manager 409 determines whether all insertion data are acquired from the insertion table 406. If it is determined that not all insertion data are acquired from the insertion table 406, the processing from step S1703 is executed for insertion data that are not yet acquired.

If all insertion data are acquired from the insertion table 406, the print processing and classified insertion table group creation processing (flowchart in FIG. 17) are ended.

Figure 18:
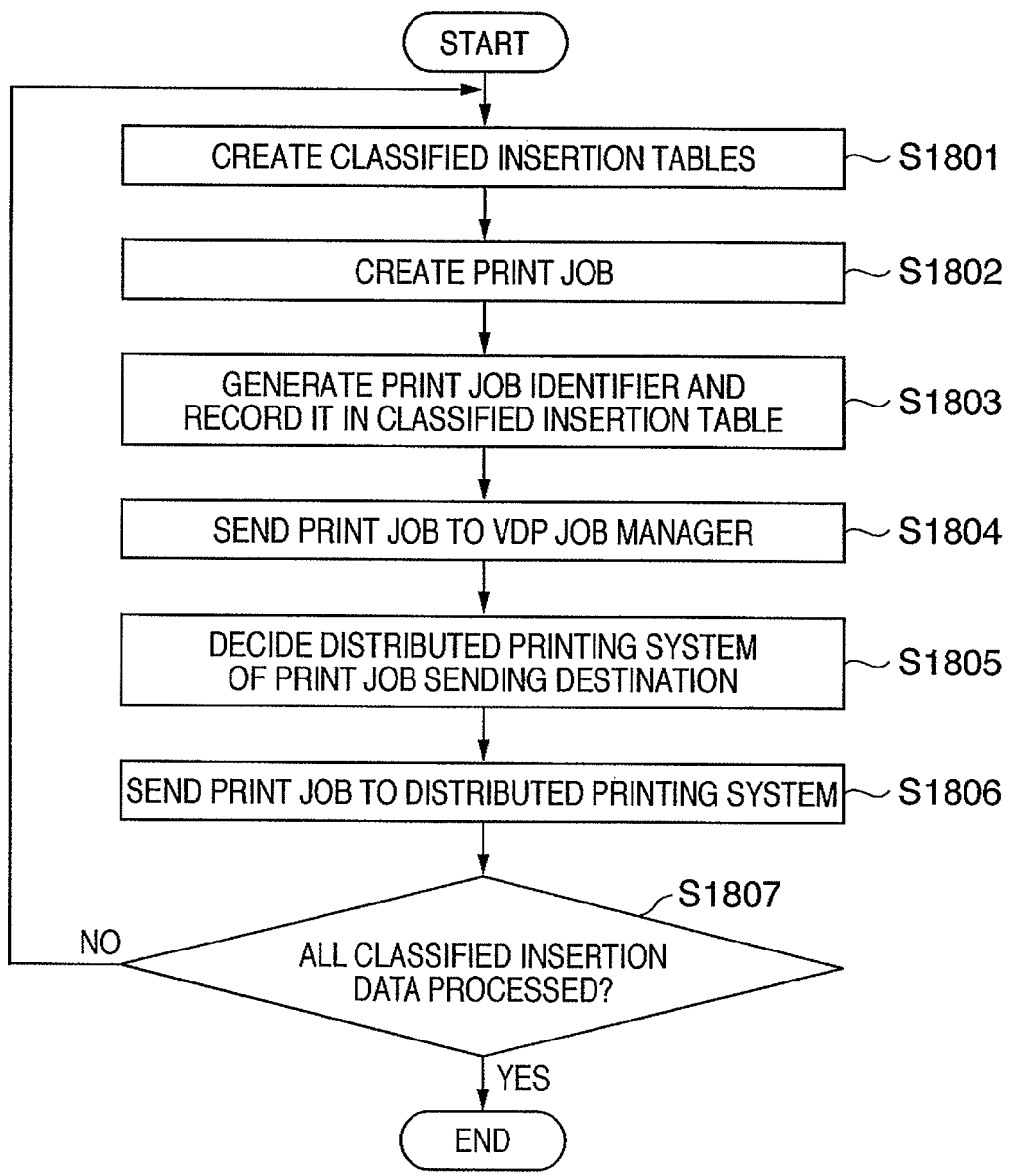
FIG. 18 is a flowchart for explaining an example of processing (print processing and classified insertion table group creation processing) executed by a VDP job generation module and a VDP job manager according to the second embodiment of the present invention.

An example of processing (print processing and classified insertion table group creation processing) executed by the VDP job generation module 403 and a VDP job manager 404 will be described next with reference to the flowchart in FIG. 18.

In step S1801, the VDP job generation module 403 acquires, via the database module 405, one classified insertion data from the classified insertion table sent from the queue manager 409 in step S1711.

In step S1802, the VDP job generation module 403 creates a print job using the classified insertion data acquired in step S1801 and the VDP document 500 created in step S1701.

In step S1803, the VDP job generation module 403 generates a print job identifier to uniquely identify a print job 1201 and embeds the generated print job identifier in the print job 1201. The VDP job generation module 403 records the print job identifier as the print job identifier of the classified insertion data via the database module 405.

In step S1804, the VDP job generation module 403 sends, to the VDP job manager 404, the print job 1201 and the classified insertion table names used to create the print job 1201.

In step S1805, the VDP job manager 404 acquires a correspondence table 901 between the classified insertion table names and the distributed printing system names from the workflow manager 408 (see FIG. 9). The VDP job manager 404 determines a distributed printing system 103 from the distributed printing system names included in the correspondence table 901 acquired from the workflow manager 408.

If the correspondence table 901 also stores printers 203 in the distributed printing systems 103 indicated by distributed printing system names 1502, the VDP job manager 404 decides, from the stored printers 203, the printer 203 that should actually execute printing.

In step S1806, the VDP job manager 404 sends the print job 1201 acquired from the VDP application 402 to the distributed printing system 103 determined in step S1805.

In step S1807, the VDP job generation module 403 determines whether all classified insertion data are acquired from classified insertion tables 701 and 702.

If it is determined that not all classified insertion data are acquired, the processing from step S1801 is executed for classified insertion data that are not yet acquired. If all classified insertion tables 701 and 702 are acquired, the print processing and classified insertion table group creation processing (flowchart in FIG. 18) are ended.

As described above, in this embodiment, when it is determined that the number of classified insertion data is a predetermined number or more, a thread of the VDP job generation module is generated. This makes it possible to asynchronously execute the print job generation processing and the insertion data classification processing (the processing of the VDP job generation module 403 and VDP job manager 404 and the processing of the queue manager 409) in parallel. It is therefore possible to efficiency execute processing even when the number of classified insertion data is a predetermined number or more. In this embodiment, printing starts after the number of classified insertion data added to the classified insertion table has reached a predetermined number. Hence, it is possible to shorten the printer idle time and more efficiently execute processing.

Third Embodiment

The third embodiment of the present invention will be described next. The above-described first and second embodiments and the third embodiment are different in part of print processing and processing of creating a classified insertion table group 407. That is, the third embodiment and the above-described first and second embodiments are mainly different in print processing and classified insertion table group creation processing. Hence, the same reference numerals as in FIGS. 1 to 18 of the above-described first and second embodiments denote the same parts in the third embodiment, and a detailed description thereof will not be repeated.

Figure 19A:
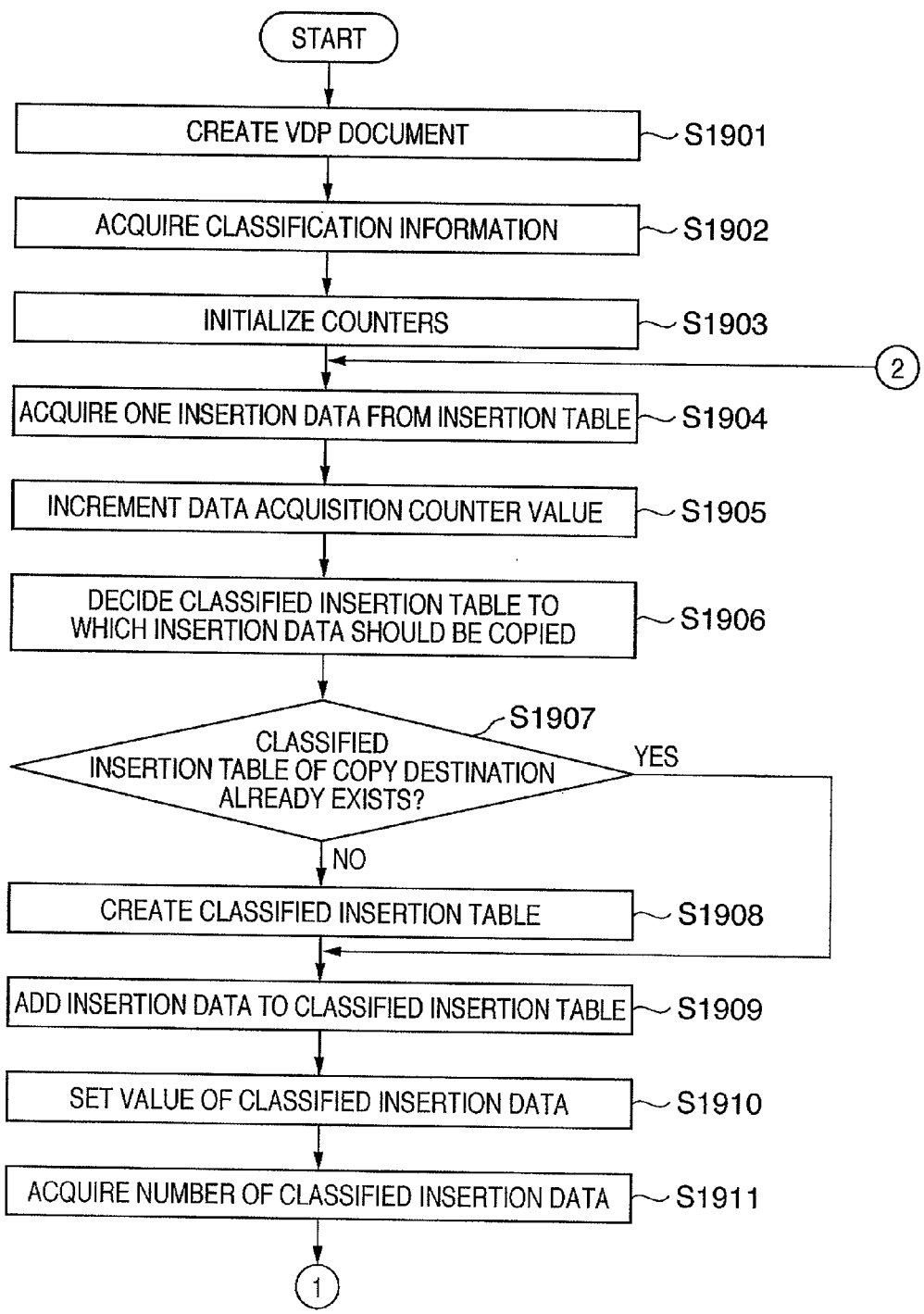
FIGS. 19A and 19B are a flowchart for explaining an example of processing (print processing and classified insertion table group creation processing) executed by a VDP application and a queue manager according to the third embodiment of the present invention.
Figure 19B:
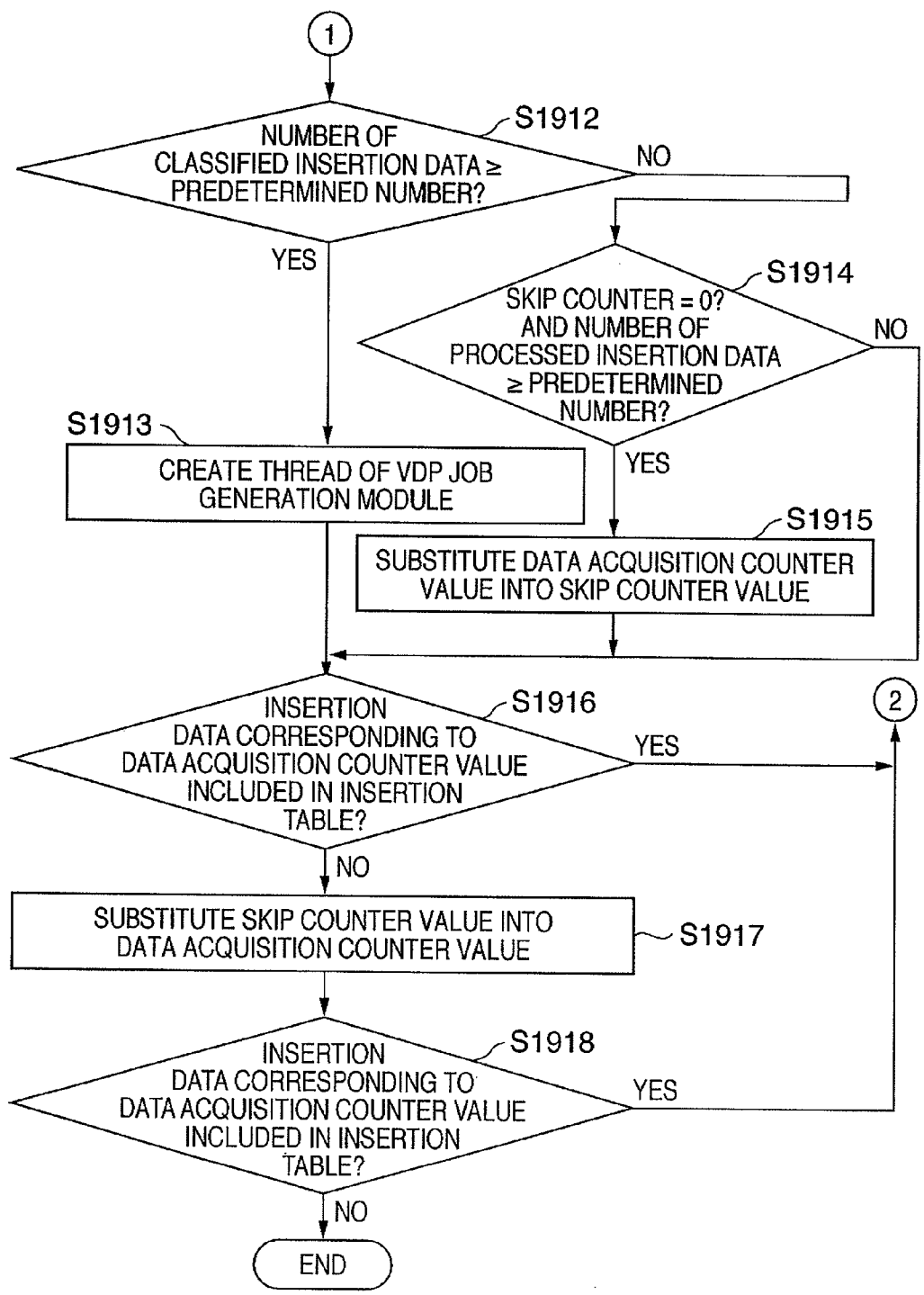

An example of processing (print processing and classified insertion table group creation processing) executed by a VDP application 402 and a queue manager 409 will be described with reference to the flowchart in FIGS. 19A and 19B. In this embodiment, the flowchart shown in FIGS. 19A and 19B is executed in place of the flowchart shown in FIG. 17 of the above-described second embodiment.

Figure 17:
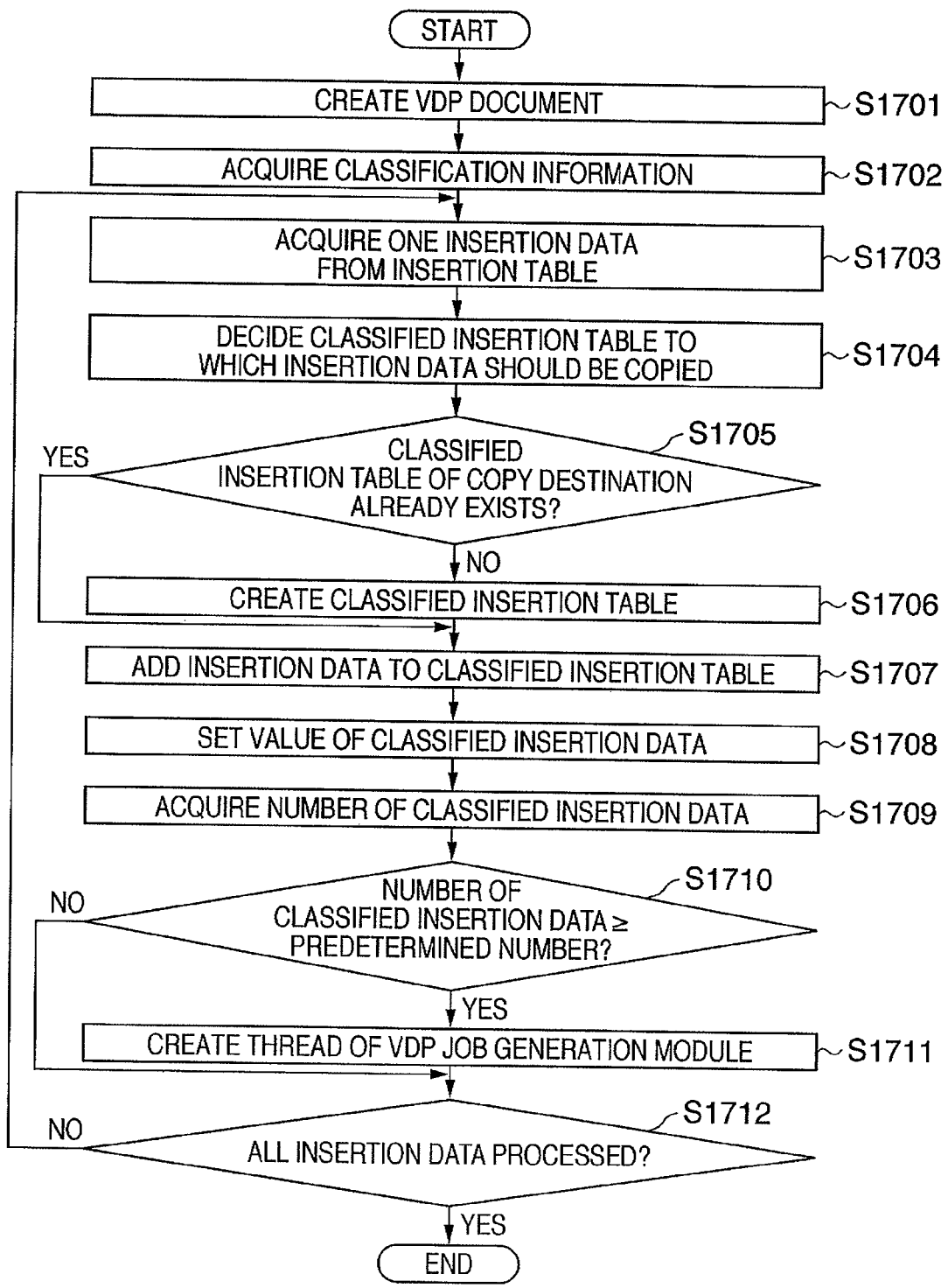
FIG. 17 is a flowchart for explaining an example of processing (print processing and classified insertion table group creation processing) executed by a VDP application and a queue manager according to the second embodiment of the present invention.

Processing in steps S1901 and S1902 is the same as in steps S1701 and S1702 in FIG. 17, and a detailed description thereof will not be repeated.

In step S1903, the queue manager 409 sets the value of a data acquisition counter indicating the ordinal number of insertion data to be acquired from an insertion table 406 to "1" and the value of a skip counter representing skip of insertion data to "0".

In step S1904, the queue manager 409 acquires one insertion data corresponding to the data acquisition counter value from the insertion table 406 via a database module 405. For example, if the data counter value is "4", insertion data "Endo-Kanagawa" is acquired from the insertion table shown in FIG. 6.

In step S1905, the queue manager 409 increments the data acquisition counter value by "1". In this embodiment, normally, the insertion data stored in the insertion table 406 are classified to classified insertion tables in a predetermined order by incrementing the data acquisition counter value by "1".

Processing in steps S1906 to S1911 is the same as in steps S1704 to S1709 in FIG. 17, and a detailed description thereof will not be repeated.

In step S1912, the queue manager 409 determines whether the number of added classified insertion data is a predetermined number or more. At this time, in this embodiment, the queue manager 409 determines whether the number of classified insertion data added to a single classified insertion table is a predetermined number or more (i.e., determines for each classified insertion table whether the number of classified insertion data is a predetermined number or more).

If it is determined that the number of added classified insertion data is a predetermined number or more, the process advances to step S1913 (to be described later). If the number of added classified insertion data is not a predetermined number or more, the process advances to step S1914.

In step S1914, the queue manager 409 determines whether the skip counter value is "0", and the number of already classified (processed) insertion data is a predetermined number or more. If the skip counter value is "0", the queue manager 409 has not executed skip processing. If it is determined in step S1914 that the skip counter value is "0", and the number of already classified insertion data is a predetermined number or more, the process advances to step S1915. As described above, in this embodiment, a second determination unit is implemented by, for example, executing the processing in step S1914.

In step S1915, the queue manager 409 substitutes the data acquisition counter value into the skip counter value. The queue manager 409 increments the current data acquisition counter value by a predetermined number. Then, the process advances to step S1916 (to be described later). As described above, in this embodiment, a second change unit is implemented by, for example, executing the processing in step S1915.

If the skip counter value is not "0", or the number of already classified insertion data which have undergone print processing is not a predetermined number or more, the process skips step S1915 and advances to step S1916 (to the described later).

If it is determined in step S1912 that the number of added insertion data is a predetermined number or more, the process advances to step S1913. In step S1913, the queue manager 409 creates one thread using a multi-thread function prepared by the OS (Operating System) and operates a VDP job generation module 403. The queue manager 409 notifies the VDP job generation module 403 of the classified insertion table decided in step S1906. The process advances to step S1916. From then on, the VDP job generation module 403 and the queue manager 409 operate asynchronously. Processing of the VDP job generation module 403 is the same as in the second embodiment (processing in FIG. 18), and a description thereof will not be repeated.

When the process thus advances to step S1916, the queue manager 409 determines whether the insertion table 406 includes insertion data corresponding to the data acquisition counter value. If it is determined that the insertion table 406 includes insertion data corresponding to the data acquisition counter value, the processing from step S1904 is executed for the insertion data.

If the insertion table 406 includes no insertion data corresponding to the data acquisition counter value, the process advances to step S1917. In step S1917, the queue manager 409 substitutes the skip counter value into the data acquisition counter value.

In step S1918, the queue manager 409 determines whether the insertion table 406 includes insertion data corresponding to the data acquisition counter value. If it is determined that the insertion table 406 includes insertion data corresponding to the data acquisition counter value, the processing from step S1904 is executed for the insertion data.

If the insertion table 406 includes no insertion data corresponding to the data acquisition counter value, the print processing and classified insertion table group creation processing (flowchart in FIGS. 19A and 19B) are ended.

An effect generated by the third embodiment will be described using a detailed example. In this description, when 10 or more classified insertion data exist, the queue manager 409 determines that the number of classified insertion data is a predetermined number or more and advances the process to step S1915. In step S1915, the queue manager 409 increments the data acquisition counter value by 85.

Figure 21:
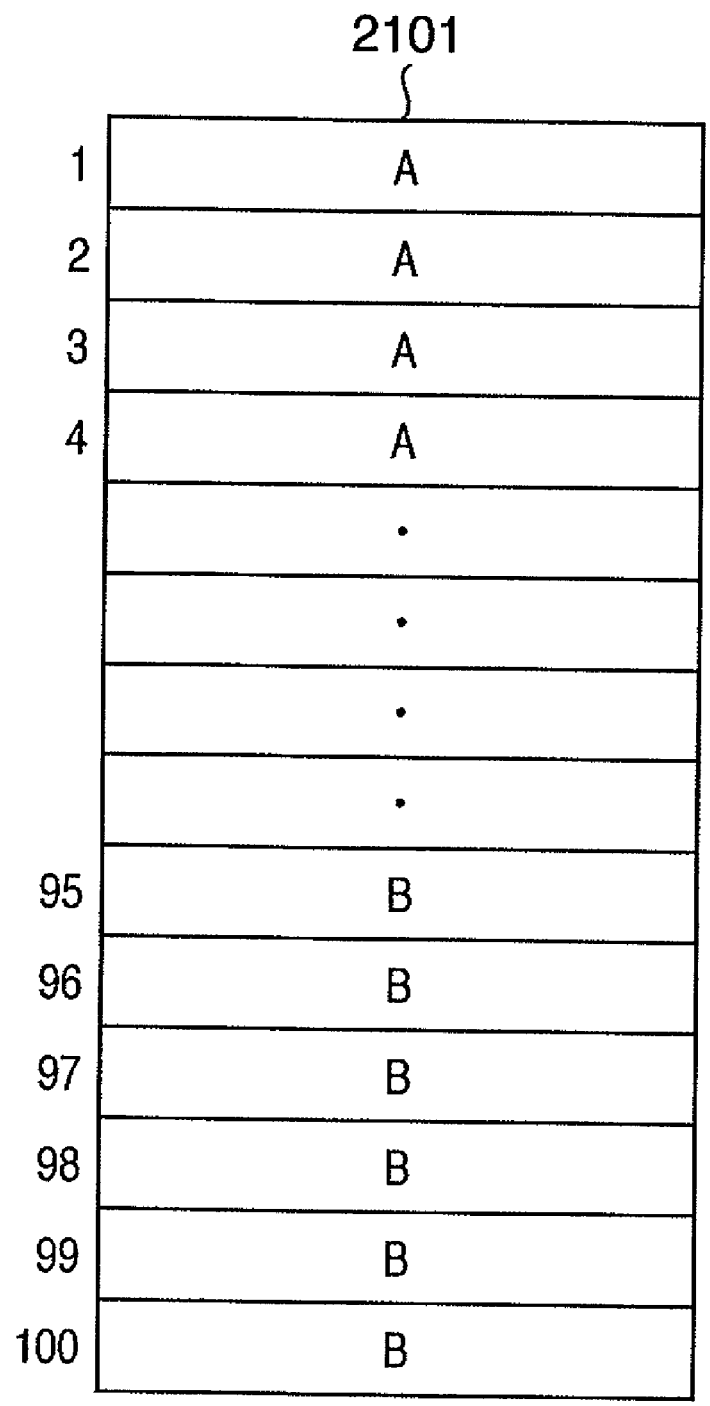
FIG. 21 is a view showing an example of an insertion data table according to the third embodiment of the present invention.

For example, as shown in FIG. 21, an insertion data table 2101 holds data A 1 to 94 to be processed by printer 1 and data B 95 to 100 to be processed by printer 2. The data are classified in this state. Only printer 1 operates during the first half, and only printer 2 operates during the second half. It may therefore be impossible to execute efficient processing.

The queue manager 409 decides a classified insertion table sequentially from the first data (step S1906). Assume that processing is sequentially executed so that the data acquisition counter reaches "10". The queue manager 409 determines here that the number of processed insertion data is a predetermined number or more. Hence, the queue manager 409 substitutes the current data acquisition counter value "10" into the skip counter and adds a predetermined number "85" to the data acquisition counter value "10". As a result, the data acquisition counter value to be processed changes to "95".

Recognizing that the insertion data table has the 95th data, the queue manager 409 can classify the "data B" that is the 95th data and operate printer 2 that prints the "data B".

Consequently, when data which use different printers in the first and second halves continue, as shown in FIG. 21, efficient distributed printing can be executed by skipping the data using the method of the third embodiment.

Note that if YES in step S1916 in FIG. 19B, the queue manager 409 determines whether to change the classification destination of insertion data to be classified next. If the classification destination should be changed, the process advances to step S1904. If the classification destination should not be changed, the skip processing may be executed again.

As described above, in this embodiment, when the number of classified insertion data added to the classified insertion tables 701 and 702 is smaller than a predetermined number even after processing of insertion data has been done to some extent, the insertion data are skipped. The skipped insertion data are processed later. This allows, for example, preventing addition of classified insertion data to only a specific classified insertion table as much as possible and executing efficient processing.

Fourth Embodiment

The fourth embodiment of the present invention will be described next. The above-described first to third embodiments and the fourth embodiment are different in part of print processing and processing of creating a classified insertion table group 407. That is, the fourth embodiment and the above-described first to third embodiments are mainly different only in print processing and classified insertion table group creation processing. Hence, the same reference numerals as in FIGS. 1 to 19 of the above-described first to third embodiments denote the same parts in the fourth embodiment, and a detailed description thereof will not be repeated.

Figure 20A:
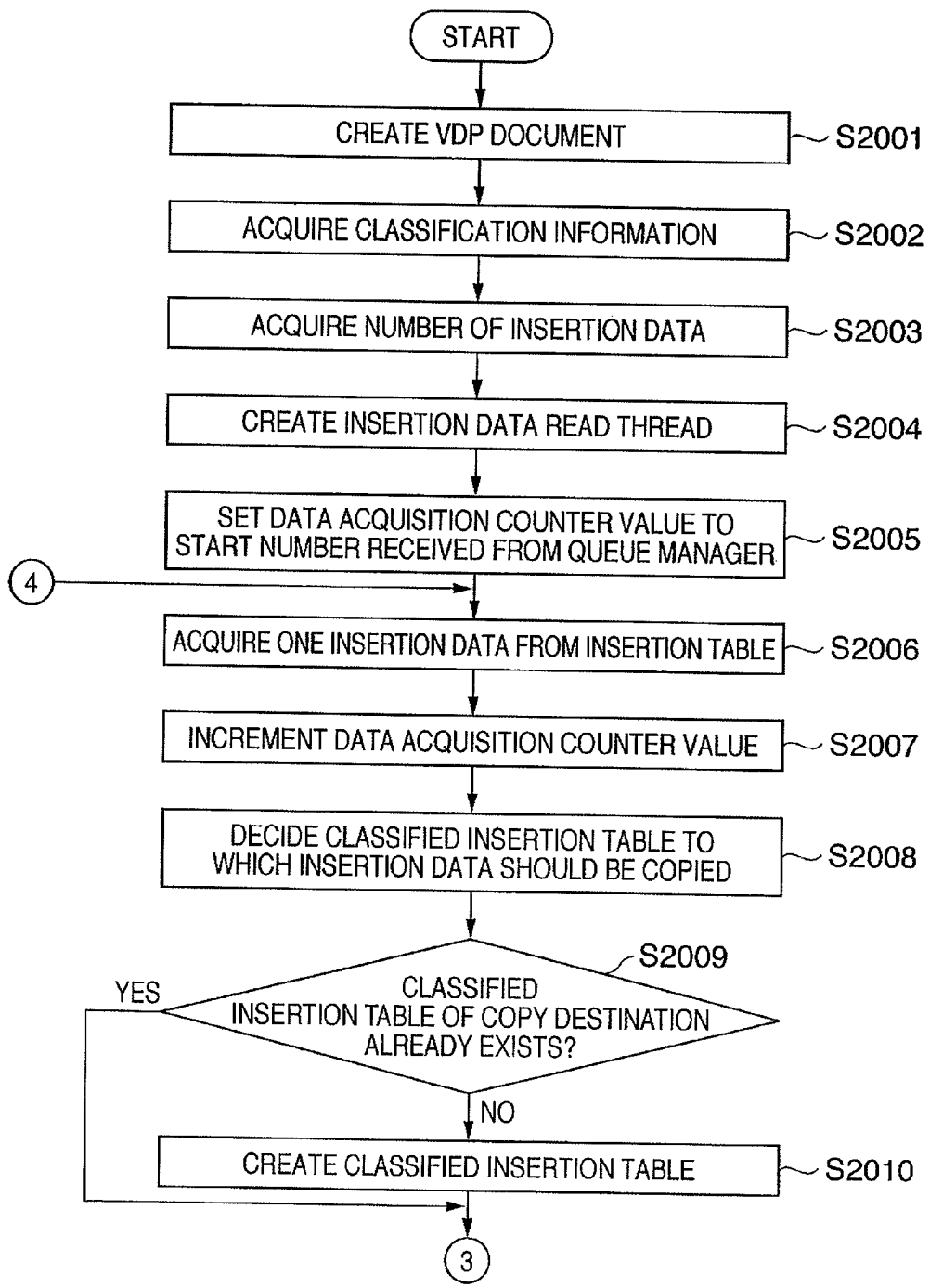
FIGS. 20A and 20B are a flowchart for explaining an example of processing (print processing and classified insertion table group creation processing) executed by a VDP application, a queue manager, and a plurality of threads created by the queue manager according to the fourth embodiment of the present invention.
Figure 20B:
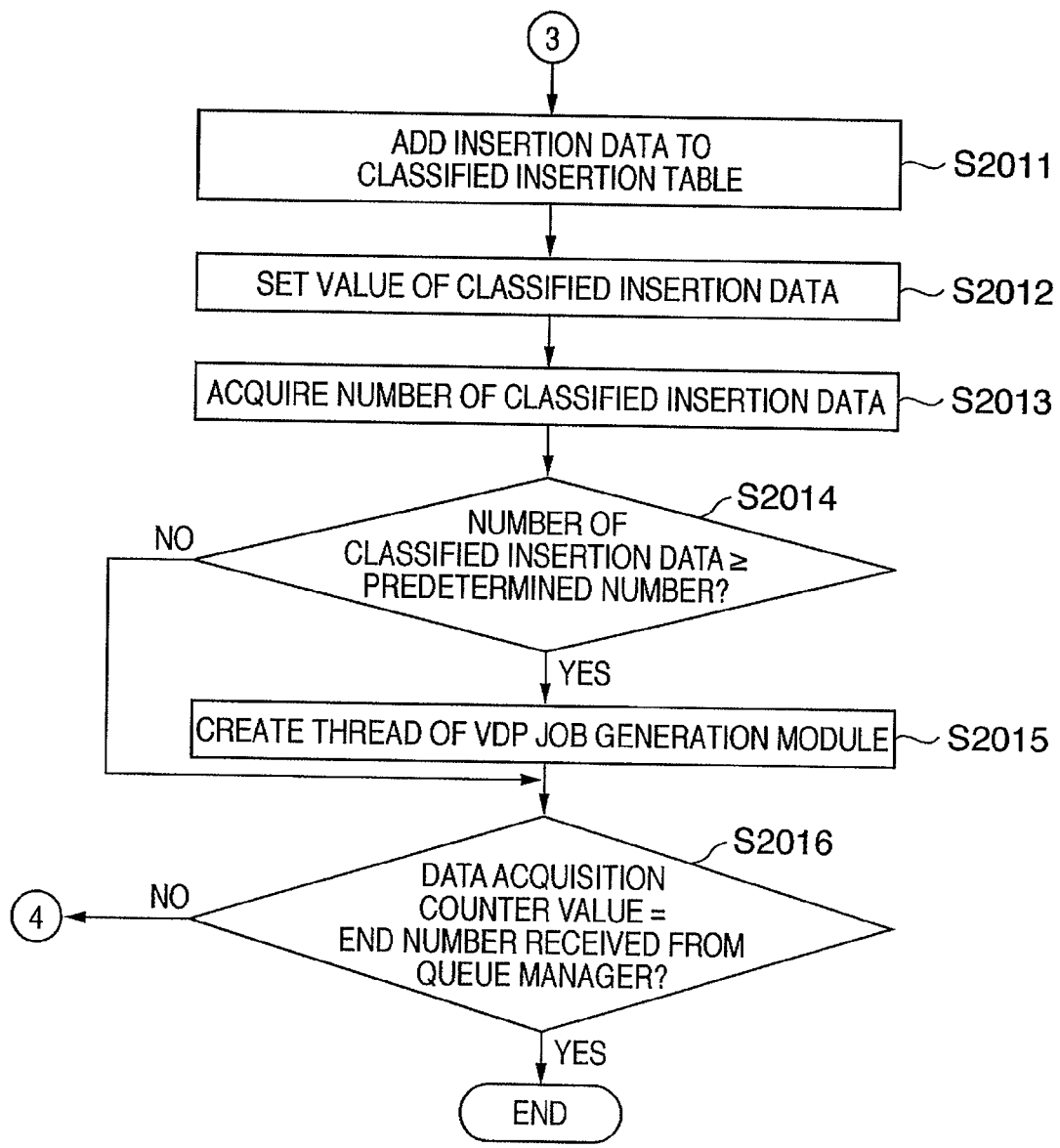

An example of processing (print processing and classified insertion table group creation processing) executed by a VDP application 402, a queue manager 409, and a plurality of threads created by the queue manager 409 will be described with reference to the flowchart in FIGS. 20A and 20B. In this embodiment, the flowchart shown in FIGS. 20A and 20B is executed in place of the flowcharts shown in FIGS. 17 and 19 of the above-described second and third embodiments.

Processing in steps S2001 and S2002 is the same as in steps S1701 and S1702, and a detailed description thereof will not be repeated.

In step S2003, the queue manager 409 acquires the number of insertion data stored in an insertion table 406 via a database module 405.

In step S2004, the queue manager 409 creates a plurality of threads corresponding to the number of insertion data acquired in step S2003 using a multi-thread function prepared by the OS (Operating System). The queue manager 409 notifies each thread of the start and end numbers of the insertion data. The start and end numbers sent from the queue manager do not repeat in the threads so that the threads can cover all insertion data numbers in the insertion table 406.

In step S2005, each thread sets the value of a data acquisition counter indicating the ordinal number of insertion data to be acquired from the insertion table to the start number received from the queue manager 409.

In step S2006, each thread acquires one insertion data corresponding to the data acquisition counter value from the insertion table 406 via the database module 405.

In step S2007, the queue manager 409 increments the data acquisition counter value by "1".

The contents of the next processing in steps S2008 to S2014 are the same as in steps S1906 to S1912 in FIGS. 19A and 19B except that the subject to execute the processing is each thread, and a detailed description thereof will not be repeated.

If it is determined in step S2014 that the number of added classified insertion data is a predetermined number or more, the process advances to step S2015. In step S2015, each thread creates one thread using a multi-thread function prepared by the OS (Operating System) and operates a VDP job generation module 403. Each thread notifies the VDP job generation module 403 of the classified insertion table decided in step S2008. The process advances to step S2016. From then on, the VDP job generation module 403 and each thread operate asynchronously. Processing of the VDP job generation module is the same as that of the second embodiment. Processing of the VDP job generation module 403 is the same as in the second embodiment (processing in FIG. 18), and a description thereof will not be repeated.

If the number of added classified insertion data is not a predetermined number or more, the process skips step S2015 and advances to step S2016.

In step S2016, each thread determines whether the data acquisition counter value equals the end number received from the queue manager 409. If it is determined that the data acquisition counter value does not equal the end number received from the queue manager 409, processing from step S2006 is executed.

If the data acquisition counter value equals the end number received from the queue manager 409, each thread is ended, and the print processing and classified insertion table group creation processing (flowchart in FIGS. 20A and 20B) are ended.

As described above, in this embodiment, a plurality of threads corresponding to the number of insertion data included in the insertion table 406 parallel (simultaneously) execute processing of classifying the insertion data included in the insertion table 406 into classified insertion tables 701 and 702. This allows, for example, preventing addition of classified insertion data to only a specific classified insertion table as much as possible and executing efficient processing.

Other Embodiments of Present Invention

The means included in the information processing apparatus and the steps of the information processing method according to the above-described embodiments of the present invention can be implemented by operating a program stored in the RAM or ROM of a computer. The present invention incorporates the program and the computer-readable recording medium that records the program.

The present invention can also be embodied as, for example, a system, apparatus, method, program, or storage medium. More specifically, the present invention is applicable to a system including a plurality of devices or an apparatus including a single device.

The present invention is achieved by supplying a software program (a program corresponding to the flowcharts shown in FIGS. 11, 13 to 15, and 17 to 20 of the embodiments) to implement the functions of the above-described embodiments to the system or apparatus directly or from a remote site and causing the computer of the system or apparatus to read out and execute the supplied program codes.

Hence, the program codes themselves which are installed in a computer to implement the functional processing of the present invention also implement the present invention. That is, the present invention also incorporates the computer program itself to implement its functional processing.

In this case, the program can take any form such as an object code, a program to be executed by an interpreter, or script data to be supplied to the OS as long as the functions of the program are available.

Examples of a recording medium to supply the program are a Floppy® disk, hard disk, optical disk, magnetooptical disk, MO, CD-ROM, CD-R, and CD-RW. A magnetic tape, non-volatile memory card, ROM, and DVD (DVD-ROM, DVD-R) are also usable.

The following program supply method is also available. A client computer is connected to a homepage on the Internet via a browser to download the computer program of the present invention itself or a compressed file containing an automatic installation function from the homepage to a recording medium such as a hard disk.

The program codes contained in the program of the present invention may be divided into a plurality of files so that the user can download the files from different homepages. That is, a WWW server which causes a plurality of users to download the program file to implement the functional processing of the present invention is also incorporated in the present invention.

The program of the present invention may be encrypted, stored in a storage medium such as a CD-ROM, and distributed to users. Any user who satisfies predetermined conditions can download key information to decrypt the program from a homepage via the Internet. The user can execute the encrypted program by using the key information and install the program in the computer.

The functions of the above-described embodiments are implemented when the computer executes the readout program. The functions of the above-described embodiments are also implemented when, for example, the OS running on the computer partially or wholly executes actual processing based on the instructions of the program.

Alternatively, the program read out from the recording medium is written in the memory of a function expansion board inserted into the computer or a function expansion unit connected to the computer. Then, the CPU of the function expansion board or function expansion unit partially or wholly executes actual processing based on the instructions of the program, thereby implementing the functions of the above-described embodiments.

The above-described embodiments are mere examples in practicing the present invention and should not limit the interpretation of technical scope of the present invention. That is, various changes and modifications can be made without departing from the technical idea and major features of the present invention.

According to the present invention, the efficiency of print processing can be increased by executing printing after the storage destinations of insertion data to be inserted into a document are classified.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-064125, filed Mar. 13, 2007, which is hereby incorporated by reference herein in its entirety.

What is claimed is:

1. An information processing apparatus for sending print data processable by each of a plurality of printing apparatuses, comprising:
    an acquiring unit constructed to acquire a plurality of insertion data sequentially from first insertion data;
    a classification unit constructed to classify each of the acquired insertion data into a first group or a second group;
    an output unit constructed to output the print data based on the insertion data classified into the first group by said classification unit to an output destination associated with the first group, and constructed to output the print data based on the insertion data classified into the second group by said classification unit to an output destination associated with the second group, in parallel;
    a changing unit constructed to change an acquiring sequence of insertion data acquired by the acquiring unit when the number of the insertion data classified into the first group is a predetermined number or more; and
    a determination unit constructed to determine whether to change a classification destination group of insertion data to be classified next when the acquiring sequence is changed,
    wherein the acquiring unit acquires the insertion data to be classified next when the determination unit determines that the classification destination group of insertion data to be classified next is changed, and the changing unit changes again the acquiring sequence when the determination unit determines that the classification destination of insertion data to be classified next is not changed, and
    wherein at least one processor executes steps stored in a memory to function as at least one of the units.

2. An information processing method in an information processing apparatus for sending print data processible by each of a plurality of printing apparatuses, the method comprising:
    an acquiring step of acquiring a plurality of insertion data sequentially from first insertion data;
    a classification step of classifying each of the acquired insertion data into a first group or a second group;
    an output step of outputting the print data based on the insertion data classified into the first group in the classification step to an output destination associated with the first group, and of outputting the print data based on the insertion data classified into the second group in said classification step to an output destination associated with the second group, in parallel;
    a changing step of changing an acquiring sequence of insertion data in the acquiring step when the number of the insertion data classified into the first group is a predetermined number or more; and
    a determination step of determining whether to change a classification destination group of insertion data to be classified next when the acquiring sequence is changed,
    wherein the acquiring step acquires the insertion data to be classified next when the determination step determines that the classification destination group of insertion data to be classified next is changed, and the acquiring sequence is changed again when the determination step determines that the classification destination of insertion data to be classified next is not changed.

3. A non-transitory computer-readable storage medium storing a computer program to be executed by an information processing apparatus for sending print data processible by each of a plurality of printing apparatuses, the computer program causing a computer to execute:
    an acquiring step of acquiring a plurality of insertion data sequentially from first insertion data;
    a classification step of classifying each of the acquired insertion data into a first group or a second group;
    an output step of outputting the print data based on the insertion data classified into the first group in the classification step to an output destination associated with the first group, and of outputting the print data based on the insertion data classified into the second group in said classification step to an output destination associated with the second group, in parallel;
    a changing step of changing an acquiring sequence of insertion data in the acquiring step when the number of the insertion data classified into the first group is a predetermined number or more; and
    a determination step of determining whether to change a classification destination group of insertion data to be classified next when the acquiring sequence is changed,
    wherein the acquiring step acquires the insertion data to be classified next when the determination step determines that the classification destination group of insertion data to be classified next is changed, and the acquiring sequence is changed again when the determination step determines that the classification destination of insertion data to be classified next is not changed.

* * * * *